(12) United States Patent
Morita et al.

(10) Patent No.: US 10,894,883 B2
(45) Date of Patent: Jan. 19, 2021

(54) CURABLE POLYORGANOSILOXANE COMPOSITION AND USE THEREOF

(71) Applicant: MOMENTIVE PERFORMANCE MATERIALS JAPAN LLC, Tokyo (JP)

(72) Inventors: Yasuhito Morita, Tokyo (JP); Koji Okawa, Tokyo (JP); Takeshi Sunaga, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 122 days.

(21) Appl. No.: 16/310,371

(22) PCT Filed: Jun. 15, 2017

(86) PCT No.: PCT/JP2017/022201
§ 371 (c)(1),
(2) Date: Dec. 14, 2018

(87) PCT Pub. No.: WO2017/217510
PCT Pub. Date: Dec. 21, 2017

(65) Prior Publication Data
US 2019/0153227 A1 May 23, 2019

(30) Foreign Application Priority Data

Jun. 15, 2016 (JP) ................... 2016-118838
Jun. 15, 2016 (JP) ................... 2016-118839
Jun. 15, 2017 (JP) ................... 2017-117745

(51) Int. Cl.
| | |
|---|---|
| *C08L 83/04* | (2006.01) |
| *G09F 9/00* | (2006.01) |
| *C08G 77/04* | (2006.01) |
| *G02F 1/1333* | (2006.01) |
| *C08G 77/12* | (2006.01) |
| *C08G 77/20* | (2006.01) |

(52) U.S. Cl.
CPC ............ *C08L 83/04* (2013.01); *C08G 77/045* (2013.01); *G02F 1/133308* (2013.01); *G09F 9/00* (2013.01); *C08G 77/12* (2013.01); *C08G 77/20* (2013.01); *C08L 2203/20* (2013.01); *C08L 2312/08* (2013.01); *G02F 2001/133325* (2013.01)

(58) Field of Classification Search
None
See application file for complete search history.

(56) References Cited

U.S. PATENT DOCUMENTS

| | | | | |
|---|---|---|---|---|
| 4,511,620 A | * | 4/1985 | Kroupa | B05D 7/532 427/387 |
| 4,709,001 A | * | 11/1987 | Maxson | C08K 5/5419 525/478 |
| 4,870,149 A | * | 9/1989 | Hara | C08G 77/20 528/15 |
| 4,983,701 A | * | 1/1991 | Hara | C08L 83/04 528/15 |
| 4,988,779 A | * | 1/1991 | Medford | C09J 183/04 525/478 |
| 4,990,560 A | * | 2/1991 | Ikeno | C08K 5/5419 524/267 |
| 5,204,437 A | * | 4/1993 | Ikeno | C08L 83/04 525/478 |
| 5,216,104 A | * | 6/1993 | Okami | C08L 83/04 528/15 |
| 5,279,890 A | * | 1/1994 | Ikeno | C08J 7/0427 428/217 |
| 5,281,656 A | * | 1/1994 | Thayer | C09D 183/04 524/601 |
| 5,571,853 A | * | 11/1996 | Ikeno | C08L 83/04 524/268 |
| 5,679,734 A | * | 10/1997 | Peccoux | C08L 83/04 524/267 |
| 5,908,897 A | * | 6/1999 | Nakamura | C08K 5/14 524/861 |
| 5,929,162 A | * | 7/1999 | Horne | A61K 8/585 424/401 |

(Continued)

FOREIGN PATENT DOCUMENTS

| | | |
|---|---|---|
| EP | 0769528 A2 | 4/1997 |
| EP | 2865719 A1 | 4/2015 |
| JP | S63256773 A | 10/1988 |
| JP | H09169908 A | 6/1997 |
| WO | 2014104080 A1 | 7/2014 |

OTHER PUBLICATIONS

International Search Report (ISR) dated Sep. 12, 2017 issued in International Application No. PCT/ JP2017/022201.
Written Opinion dated Sep. 12, 2017 issued in International Application No. PCT/JP2017/022201.
Extended European Search Report (EESR) dated Dec. 2, 2019 issued in European Application No. 17813404.5.

*Primary Examiner* — Robert S Loewe
(74) *Attorney, Agent, or Firm* — Holtz, Holtz & Volek PC

(57) ABSTRACT

The present invention is an addition reaction type polyorganosiloxane composition which can be cured rapidly at room temperature. A cured product of the composition exhibits high elongation, excellent stress relaxation properties and good reliability under conditions of high temperature and high humidity and exhibits excellent reliability in cold/heat cycling. The composition contains: (A1) a straight chain polysiloxane containing alkenyl groups at both terminals; (B1) a straight chain polysiloxane containing SiH groups at both terminals; (B2) a crosslinkable polyorganohydrogensiloxane; one or more types selected from the group consisting of (A2) a straight chain polysiloxane containing an alkenyl group at one terminal and (B3) a straight chain polysiloxane containing a SiH group at one terminal; and (C) a platinum-based catalyst. The content of component A2 is 0-60 parts by weight relative to a total of 100 parts by weight of components A1 and A2, and the value of $(H_{B1}+H_{B2}+H_{B3})/(Vi_{A1}+Vi_{A2})$ (in the formula, $Vi_{A1}$, $Vi_{A2}$, $H_{B1}$, $H_{B2}$ and $H_{B3}$ are as disclosed in the description) is 0.6-2.2.

19 Claims, No Drawings

(56) References Cited

U.S. PATENT DOCUMENTS

| | | | | |
|---|---|---|---|---|
| 6,355,724 | B1* | 3/2002 | LeGrow | A61K 8/042 |
| | | | | 424/401 |
| 8,187,490 | B2* | 5/2012 | Tabei | C08L 83/04 |
| | | | | 106/287.13 |
| 8,263,723 | B2* | 9/2012 | Morita | C08G 77/50 |
| | | | | 528/10 |
| 2004/0176528 | A1* | 9/2004 | Yoshitake | C08L 83/04 |
| | | | | 524/588 |
| 2005/0250903 | A1* | 11/2005 | Tanaka | C08L 83/04 |
| | | | | 524/861 |
| 2005/0272893 | A1* | 12/2005 | Tanaka | C08L 83/04 |
| | | | | 528/15 |
| 2009/0123764 | A1* | 5/2009 | Morita | C08G 77/20 |
| | | | | 428/446 |
| 2009/0258216 | A1* | 10/2009 | Yamakawa | C09J 183/14 |
| | | | | 428/323 |
| 2011/0269918 | A1 | 11/2011 | Hamamoto et al. | |
| 2012/0322942 | A1* | 12/2012 | Berghmans | C08L 83/04 |
| | | | | 524/783 |
| 2013/0071673 | A1 | 3/2013 | Okawa et al. | |
| 2015/0337188 | A1 | 11/2015 | Sakakibara et al. | |
| 2015/0337189 | A1 | 11/2015 | Takanashi et al. | |
| 2016/0108240 | A1* | 4/2016 | Kashiwagi | C09D 183/14 |
| | | | | 525/478 |

\* cited by examiner

CURABLE POLYORGANOSILOXANE COMPOSITION AND USE THEREOF

TECHNICAL FIELD

The present invention relates to a curable polyorganosiloxane composition, and particularly relates to a curable polyorganosiloxane composition for use in adhering a base portion having an image display part for an image display device to a light-transmitting protective portion.

BACKGROUND ART

An image display device such as a cathode ray tube, liquid crystal, plasma or organic EL image display device, is generally composed of, as a polarization splitting element, a polarization split-type diffraction optical element (a holographic color filter), which diffracts and disperse an incident beam and selectively condenses the resultant lights in the separate wavelength regions on the positions corresponding to the respective picture elements of R (red), G (green) and B (blue) colors formed on a polarization modulation element. Especially, an image display device of a panel type generally has a pair of substrates, at least one of which is a substrate having light transmission properties, such as glass, and has a display area (an image display part) disposed between the substrates, wherein in the display area a number of picture elements composed of a semiconductor layer, a fluorescent layer or a light emitting layer constituting an active element are arranged in a matrix form. In the image display device of a panel type, a gap between the display area (the image display part) and a protective portion formed from glass or an optical plastic such as an acrylic resin, is airtightly sealed using an adhesive.

As the adhesive used in the above-mentioned sealing, an ultraviolet curing resin composition using an acrylic resin is not used but a thermosetting resin composition is generally used, due to the structure of the image display device, for example, in which a light blocking paint is applied to the outer frame portion of the protective portion.

With respect to electronic parts such as a transistor, a diode, a capacitor, a coil, an LSI and an IC, which are sealed using a sealing resin, such as an epoxy resin or a polyphenylene sulfide resin, Patent Literature 1 discloses a technique in which a gap frequently occurred at the interface between the sealing resin and a lead of the electronic part, or a gap inevitably present in the electronic part due to its structure is impregnated with a specific thermosetting silicone resin composition in a liquid state and the resin composition is thermally cured to recover the sealed state.

CITATION LIST

Patent Literature

Patent Literature 1: Japanese Patent Application Kokai Publication No. H9-169908

SUMMARY OF INVENTION

Technical Problem

The thermosetting silicone resin composition disclosed in Patent Literature 1 uses a chained polyorganohydrogensiloxane which has three or more hydrogen atoms bonded to silicon atoms per molecule in a side chain of the molecular chain. However, the thermosetting silicone resin composition disclosed in Patent Literature 1 has low reactivity, and therefore has problems that the composition is cured slowly at low temperatures and that the composition is not cured in a predetermined time.

In addition, an adhesive using the silicone resin composition poses a problem that, after substrates are laminated each other, air bubbles are likely to be generated in the adhesive under high-temperature and high-humidity conditions, causing the visibility to be poor. Further, when a cured product of the silicone resin composition has poor flexibility, a cured product of the composition used for laminating a PMMA (polymethyl methacrylate) panel and an LCD (a liquid crystal display) panel, which are members used in an image display device, cannot relax a stress caused due to warpage of PMMA. Therefore, the silicone resin composition has problems that a crack is generated in the cured product of the composition and the cured product of the composition is peeled from the panel.

An object of the present invention is to provide an addition reaction-type polyorganosiloxane composition having a fast-curing property at room temperature, wherein a cured product of the composition has high elongation, excellent stress relaxation, good reliability properties under high-temperature and high-humidity conditions, and excellent cold heat cycle reliability.

Solution to Problem

The present invention has the following constitutions.

[1] A curable polyorganosiloxane composition comprising:

(A1) an alkenyl group-containing polyorganosiloxane represented by the following formula (I):

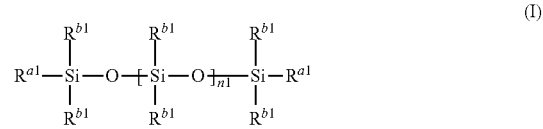

wherein:
each $R^{a1}$ is independently a $C_2$-$C_6$ alkenyl group,
each $R^{b1}$ is independently a $C_1$-$C_6$ alkyl group or a $C_6$-$C_{20}$ aryl group, and
n1 is a value such that the viscosity of the component (A1) at 23° C. is 10 to 1,000,000 mPa·s;

(B1) a polyorganohydrogensiloxane represented by the following formula (II):

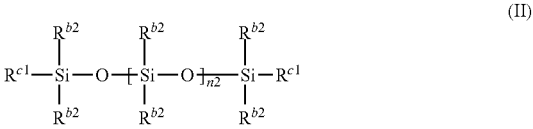

wherein:
each $R^{c1}$ is a hydrogen atom,
each $R^{b2}$ is independently a $C_1$-$C_6$ alkyl group or a $C_6$-$C_{20}$ aryl group, and
n2 is a value such that the viscosity of the component (B1) at 23° C. is 0.1 to 300 mPa·s;

(B2) a polyorganohydrogensiloxane comprising a $R^{b3}{}_2R^{c2}SiO_{1/2}$ unit (wherein each $R^{b3}$ is independently a $C_1$-$C_6$ alkyl group or a $C_6$-$C_{20}$ aryl group, and $R^{c2}$ is a hydrogen atom) and a $SiO_{4/2}$ unit, and having three or more hydrogen atoms bonded to silicon atoms per molecule;

at least one member selected from the group consisting of (A2) an alkenyl group-containing polyorganosiloxane represented by the following formula (III):

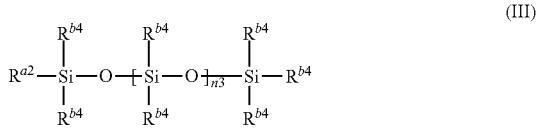

(III)

wherein:
each $R^{a2}$ is independently a $C_2$-$C_6$ alkenyl group,
each $R^{b4}$ is independently a $C_1$-$C_6$ alkyl group or a $C_6$-$C_{20}$ aryl group, and
n3 is a value such that the viscosity of the component (A2) at 23° C. is 10 to 1,000,000 mPa·s,
and (B3) a linear polyorganohydrogensiloxane represented by the following formula (IV):

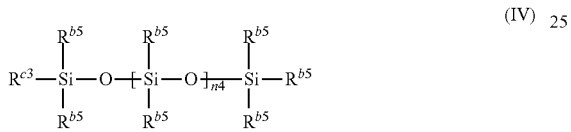

(IV)

wherein:
$R^{c3}$ is a hydrogen atom,
each $R^{b5}$ is independently a $C_1$-$C_6$ alkyl group or a $C_6$-$C_{20}$ aryl group, and
n4 is a value such that the viscosity of the component (B3) at 23° C. is 0.1 to 300 mPa·s; and (C) a platinum-based catalyst,
wherein the amount of the component (A2) is 0 to 60 parts by weight, relative to 100 parts by weight of the total of the components (A1) and (A2), and the value of $(H_{B1}+H_{B2}+H_{B3})/(Vi_{A1}+Vi_{A2})$ is 0.6 to 2.2, wherein $Vi_{A1}$ is the molar number of the alkenyl groups of the component (A1), $Vi_{A2}$ is the molar number of the alkenyl groups of the component (A2), $H_{B1}$ is the molar number of the hydrogen atoms bonded to the silicon atoms of the component (B1), $H_{B2}$ is the molar number of the hydrogen atoms bonded to the silicon atoms of the component (B2), and $H_{B3}$ is the molar number of the hydrogen atoms bonded to the silicon atoms of the component (B3).

[2] The curable polyorganosiloxane composition according to item [1], wherein the component (B2) is a cyclic polyorganohydrogensiloxane having a cyclic siloxane skeleton formed from 3 to 5 $SiO_{4/2}$ units, in which two $R^{b3}_2R^{c2}SiO_{1/2}$ units are bonded to each $SiO_{4/2}$ unit.

[3] The curable polyorganosiloxane composition according to item [1] or [2], which contains the component (A2), wherein the value of $(H_{B1}+H_{B2})/(Vi_{A1}+Vi_{A2})$ is 0.6 to 2.2.

[4] The curable polyorganosiloxane composition according to item [3], wherein the amount of the component (A2) is 5 to 37 parts by weight, relative to 100 parts by weight of the total of the components (A1) and (A2), the value of $(H_{B1}+H_{B2})/(Vi_{A1}+Vi_{A2})$ is 0.6 to 0.99, and the value of $H_{B1}/(H_{B1}+H_{B2})$ is 0.3 to 0.8.

[5] The curable polyorganosiloxane composition according to any one of items [1] to [4], which contains the component (B3), wherein the value of $(H_{B1}+H_{B2}+H_{B3})/Vi_{A1}$ is 0.6 to 2.5.

[6] The curable polyorganosiloxane composition according to item [5], wherein the value of $(H_{B1}+H_{B2}+H_{B3})/Vi_{A1}$ is 0.6 to 0.99.

[7] The curable polyorganosiloxane composition according to any one of items [1] to [6], which is for adhering a base portion having an image display part for an image display device to a light-transmitting protective portion.

[8] An image display device which has a base portion having an image display part for the image display device and a light-transmitting protective portion, wherein the base portion is adhered to the protective portion using the curable polyorganosiloxane composition according to any one of items [1] to [7].

Advantageous Effects of Invention

In the present invention, there is provided an addition reaction-type polyorganosiloxane composition having a fast-curing property at room temperature, wherein a cured product of the composition has high elongation, excellent stress relaxation, good reliability properties under high-temperature and high-humidity conditions, and excellent cold heat cycle reliability.

DESCRIPTION OF EMBODIMENTS

[Curable Polyorganosiloxane Composition]

The curable polyorganosiloxane composition (hereinafter, frequently referred to simply as "the composition") comprises (A1); (B1); (B2); at least one member selected from the group consisting of (A2) and (B3); and (C) a platinum-based catalyst, wherein the amount of (A2) is 0 to 60 parts by weight, relative to 100 parts by weight of the total of (A1) and (A2), and the value of $(H_{B1}+H_{B2}+H_{B3})/(Vi_{A1}+Vi_{A2})$ is 0.6 to 2.2, wherein $Vi_{A1}$ is the molar number of the alkenyl groups of (A1), $Vi_{A2}$ is the molar number of the alkenyl groups of (A2), $H_{B1}$ is the molar number of the hydrogen atoms bonded to the silicon atoms of (B1), $H_{B2}$ is the molar number of the hydrogen atoms bonded to the silicon atoms of (B2), and $H_{B3}$ is the molar number of the hydrogen atoms bonded to the silicon atoms of (B3).

The composition contains "a combination of (A2) and (B3)", "(A2)" or "(B3)". When the composition contains (A2) and does not contain (B3), the "$(H_{B1}+H_{B2}+H_{B3})/(Vi_{A1}+Vi_{A2})$" is "$(H_{B1}+H_{B2})/(Vi_{A1}+Vi_{A2})$". When the composition contains (B3) and does not contain (A2), the "$(H_{B1}+H_{B2}+H_{B3})/(Vi_{A1}+Vi_{A2})$" is "$(H_{B1}+H_{B2}+H_{B3})/Vi_{A1}$", and the amount of (A2) contained is 0 part by weight, relative to 100 parts by weight of the total of (A1) and (A2).

(B2) is also referred to as "a crosslinkable polyorganohydrogensiloxane".

(1) (A1) Alkenyl group-containing polyorganosiloxane represented by the formula (I)

(A1) is represented by the following formula (I):

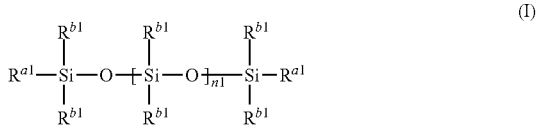

(I)

wherein:
each $R^{a1}$ is independently a $C_2$-$C_6$ alkenyl group,
each $R^{b1}$ is independently a $C_1$-$C_6$ alkyl group or a $C_6$-$C_{20}$ aryl group, and n1 is a value such that the viscosity of the component (A1) at 23° C. is 10 to 1,000,000 mPa·s.

(A1) is a both-ends alkenyl group-containing linear polyorganosiloxane having an alkenyl group at both ends of the siloxane chain.

By virtue of containing (A1), the composition surely forms a stable three-dimensional structure by a crosslinking reaction during the curing of the composition, so that the elongation of a cured product of the composition can be controlled, ensuring excellent visibility.

Examples of $C_2$-$C_6$ alkenyl groups include a vinyl group, an allyl group, a 3-butenyl group and a 5-hexenyl group. Examples of $C_1$-$C_6$ alkyl groups include a methyl group, an ethyl group, a propyl group, a butyl group, a pentyl group and a hexyl group. Examples of $C_6$-$C_{20}$ aryl groups include a phenyl group, a naphthyl group and an anthracenyl group.

From the viewpoint of facilitating the synthesis of the compound and causing no adverse effect on the fluidity of the composition before being cured and the heat resistance of a cured product of the composition, $R^{a1}$ is preferably a vinyl group. From the viewpoint of facilitating the synthesis of the compound and achieving excellent balance between, for example, the fluidity of the composition and the mechanical strength of the cured product, $R^{b1}$ is preferably a $C_1$-$C_6$ alkyl group, and especially preferably a methyl group. Accordingly, (A1) is preferably a polymethylvinylsiloxane having both ends blocked by dimethylvinylsiloxane units and having an intermediate unit comprising a dimethylsiloxane unit.

From the viewpoint of ensuring the stable liquid state of the composition, the viscosity of (A1) at 23° C. is 10 to 1,000,000 mPa·s, preferably 50 to 1,000,000 mPa·s, and more preferably 100 to 500,000 mPa·s. It is preferred that the weight average molecular weight of (A1), that is, n1 is controlled so that the viscosity of (A1) falls in the above range.

In the present specification, the viscosity is a value as measured using a rotational viscometer under conditions at 60 rpm and at 23° C. in accordance with JIS K 6249.

(2) (B1) Polyorganohydrogensiloxane represented by the formula (II)

(B1) is a polyorganohydrogensiloxane represented by the following formula (II):

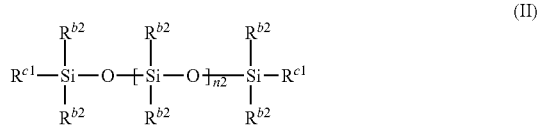

(II)

wherein:
each $R^{c1}$ is a hydrogen atom,
each $R^{b2}$ is independently a $C_1$-$C_6$ alkyl group or a $C_6$-$C_{20}$ aryl group, and
n2 is a value such that the viscosity of the component (B1) at 23° C. is 0.1 to 300 mPa·s.

(B1) is a both-ends SiH group-containing linear polyorganosiloxane having at both ends of the siloxane chain a hydrogen atom bonded to a silicon atom.

(B1) is a component which extends the molecular chain between crosslinking sites to improve the elongation and stress relaxation property of a cured product of the composition.

From the viewpoint of facilitating the synthesis of the compound and achieving excellent balance between properties, such as the mechanical strength and the fluidity of the composition before being cured, $R^{b2}$ is preferably a $C_1$-$C_6$ alkyl group, and especially preferably a methyl group. Accordingly, (B1) is preferably a polymethylhydrogensiloxane having both ends blocked by dimethylhydrogensiloxane units and having an intermediate unit comprising a dimethylsiloxane unit.

The viscosity of (B1) at 23° C. is 0.1 to 300 mPa·s, preferably 1 to 200 mPa·s, more preferably 0.1 to 50 mPa·s, and especially preferably 1 to 30 mPa·s. It is preferred that the weight average molecular weight of (B1), that is, n2 is controlled so that the viscosity of (B1) falls in the above range.

(3) (B2) Crosslinkable polyorganohydrogensiloxane (B2) is a polyorganohydrogensiloxane comprising a $R^{b3}_2R^{c2}SiO_{1/2}$ unit (wherein each $R^{b3}$ is independently a $C_1$-$C_6$ alkyl group or a $C_6$-$C_{20}$ aryl group, and $R^{c2}$ is a hydrogen atom) and a $SiO_{4/2}$ unit, and having three or more hydrogen atoms bonded to silicon atoms per molecule.

(B2) is a component which contributes to forming a network structure of a cured product of the composition so as to control the hardness. (B2) may be either branched or cyclic. The number of $R^{c2}$, which is a hydrogen atom bonded to a silicon atom, is preferably 3 to 100 per molecule, and more preferably 3 to 50. From the viewpoint of, for example, facilitating the synthesis of the compound, $R^{b3}$ is preferably a $C_1$-$C_6$ alkyl group, and especially preferably methyl. Accordingly, (B2) is preferably a polyorganohydrogensiloxane having a cyclic siloxane skeleton formed from 3 to 5 $SiO_{4/2}$ units, in which two $R^{b3}_2R^{c2}SiO_{1/2}$ units are bonded to each $SiO_{4/2}$ unit, such as $[R^{b3}_2R^{c2}SiO_{1/2}]_8[SiO_{4/2}]_4$ or $[R^{b3}_2R^{c2}SiO_{1/2}]_{10}[SiO_{4/2}]_5$.

The viscosity of (B2) is preferably 1 to 100 mPa·s, and more preferably 1 to 50 mPa·s.

(4) At least one member selected from the group consisting of (A2) an alkenyl group-containing polyorganosiloxane represented by the formula (III) and (B3) a linear polyorganohydrogensiloxane represented by the formula (IV)

(A2) is represented by the following formula (III):

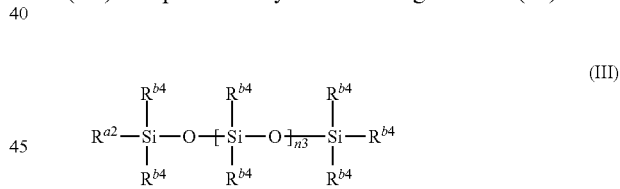

(III)

wherein:
each $R^{a2}$ is independently a $C_2$-$C_6$ alkenyl group,
each $R^{b4}$ is independently a $C_1$-$C_6$ alkyl group or a $C_6$-$C_{20}$ aryl group, and
n3 is a value such that the viscosity of the component (A2) at 23° C. is 10 to 1,000,000 mPa·s, and (B3) is represented by the following formula (IV):

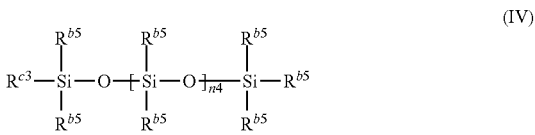

(IV)

wherein:
$R^{c3}$ is a hydrogen atom,
each $R^{b5}$ is independently a $C_1$-$C_6$ alkyl group or a $C_6$-$C_{20}$ aryl group, and n4 is a value such that the viscosity of the component (B3) at 23° C. is 0.1 to 300 mPa·s.

(A2) is a one-end alkenyl group-containing linear polyorganosiloxane having an alkenyl group only at one end of the siloxane chain, and (B3) is a one-end SiH group-containing linear polyorganosiloxane having only at one end of the siloxane chain a hydrogen atom bonded to a silicon atom. That is, (A2) and (B3) have only at one end of the siloxane chain a reactive group (i.e., an alkenyl group in (A2) or a hydrosilyl group (SiH) in (B3)). By virtue of containing (A2) and/or (B3), the composition can appropriately reduce the density of a three-dimensional structure formed by a crosslinking reaction during the curing of the composition, making it possible to improve the stress relaxation property of a cured product of the composition.

In the formula (III), $R^{a2}$ is synonymous with $R^{a1}$, including the preferred groups. $R^{b4}$ is synonymous with $R^{b1}$, including the preferred groups. Accordingly, (A2) is preferably polymethylvinylsiloxane having one end blocked by a dimethylvinylsiloxane unit and another end blocked by a trimethylsiloxane unit, and having an intermediate unit comprising a dimethylsiloxane unit.

From the viewpoint of ensuring the stable liquid state of the composition, the viscosity of (A2) at 23° C. is 10 to 1,000,000 mPa·s, preferably 50 to 1,000,000 mPa·s, and more preferably 100 to 500,000 mPa·s. It is preferred that the weight average molecular weight of (A2), that is, n3 is controlled so that the viscosity of (A2) falls in the above range.

In the formula (IV), from the viewpoint of facilitating the synthesis of the compound and achieving excellent balance between properties, such as the mechanical strength and the fluidity of the composition before being cured, $R^{b5}$ is preferably a $C_1$-$C_6$ alkyl group, and especially preferably a methyl group. Accordingly, (B3) is preferably a polymethylhydrogensiloxane having one end blocked by a dimethylhydrogensiloxane unit and another end blocked by a trimethylsiloxane unit, and having an intermediate unit comprising a dimethylsiloxane unit.

The viscosity of (B3) at 23° C. is 0.1 to 300 mPa·s, preferably 1 to 200 mPa·s, more preferably 1 to 50 mPa·s, and especially preferably 1 to 30 mPa·s. It is preferred that the weight average molecular weight of (B3), that is, n4 is controlled so that the viscosity of (B3) falls in the above range.

(5) (C) Platinum-based catalyst (C) is a catalyst for accelerating an addition reaction between the alkenyl groups of (A1) and (A2) and the hydrosilyl groups (SiH) of (B1), (B2) and (B3). From the viewpoint of excellent catalytic activity, a compound of a metal atom of the platinum group such as platinum, rhodium or palladium is preferably used, and preferred are platinum compounds such as a chloroplatinic acid, a reaction product of a chloroplatinic acid and an alcohol, a platinum-olefin complex, a platinum-vinylsiloxane complex, a platinum-ketone complex and a platinum-phosphine complex; rhodium compounds such as a rhodium-phosphine complex and a rhodium-sulfide complex; and palladium compounds such as a palladium-phosphine complex, more preferred are platinum compounds, and especially preferred is a platinum-vinylsiloxane complex.

(Additive)

The composition can contain at least one additive selected from the group consisting of (D) a diluent, (E) a tackifier and (F) an inhibitor for the platinum-based catalyst in such an amount that the effects of the present invention are not damaged. The diluent (D), the tackifier (E) and the inhibitor (F) for the platinum-based catalyst may be used individually or in combination of two or more thereof, respectively.

When the composition contains a diluent (D), the viscosity of the composition is appropriately controlled. (D) is a silicone oil which does not contain an alkenyl group related to the curing reaction, and is preferably a polymethylsiloxane having both ends blocked by trimethylsiloxane units and having an intermediate unit comprising a dimethylsiloxane unit. The viscosity of (D) at 23° C. is preferably 1 to 5,000 mPa·s, and more preferably 5 to 1,000 mPa·s.

When the composition contains a tackifier (E), the adhesive strength between the composition and a substrate is further improved. Examples of tackifiers (E) include di-, tri- or tetra-alkoxysilanes such as tetramethoxysilane, tetraethoxysilane, tetrapropoxysilane, tetrabutoxysilane, methyltrimethoxysilane, dimethyldimethoxysilane, methyltriethoxysilane and dimethyldiethoxysilane; 3-glycidoxypropyl group-containing alkoxysilanes such as 3-glycidoxypropyltrimethoxysilane, 3-glycidoxypropyltriethoxysilane, 3-glycidoxypropyl(methyl)dimethoxysilane and 3-glycidoxypropyl(methyl)diethoxysilane; 2-(3,4-epoxycyclohexyl)ethyl group-containing alkoxysilanes such as 2-(3,4-epoxycyclohexyl)ethyltrimethoxysilane, 2-(3,4-epoxycyclohexyl)ethyltriethoxysilane and 2-(3,4-epoxycyclohexyl)ethyl(methyl)dimethoxysilane; alkenylalkoxysilanes such as vinyltrimethoxysilane, vinyltriethoxysilane, vinyltris(2-methoxyethoxy)silane, methylvinyldimethoxysilane, allyltrimethoxysilane, allyltriethoxysilane and methylallyldimethoxysilane; (meth)acryloxypropylalkoxysilanes such as 3-acryloxypropyltrimethoxysilane, 3-acryloxypropyltriethoxysilane, 3-acryloxypropyl(methyl)dimethoxysilane, 3-methacryloxypropyltrimethoxysilane, 3-methacryloxypropyltriethoxysilane and 3-methacryloxypropyl(methyl)dimethoxysilane; and organosilicon compounds such as a reaction product of 1,1,3,5,7-pentamethylcyclotetrasiloxane and 3-methacryloxypropyltrimethoxysilane.

As the organosilicon compound, for example, specifically, there can be mentioned an organosilicon compound having a side chain represented by the following formula:

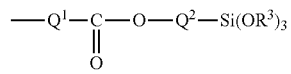

wherein each of $Q^1$ and $Q^2$ independently represents an alkylene group, preferably a $C_1$-$C_4$ alkylene group, and $R^3$ represents a $C_1$-$C_4$ alkyl group.

With respect to the organosilicon compound, preferred are compounds shown below.

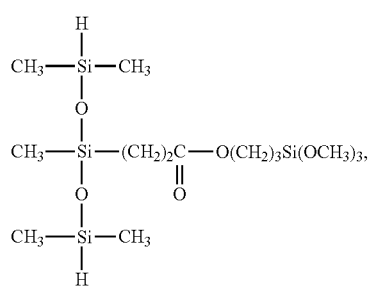

-continued

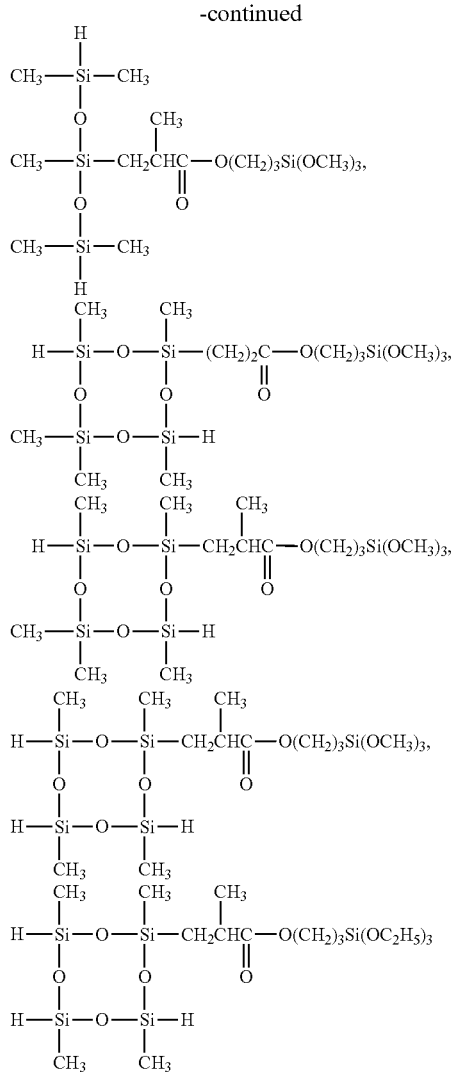

When the composition contains an inhibitor (F) for the platinum-based catalyst, the curing rate of the composition is appropriately controlled. Examples of inhibitors (F) for the platinum-based catalyst include one or more members selected from the group consisting of an acetylenic silane, an olefinic siloxane having a 3-hydroxy-2-propenyl (OH—C(CH$_3$)$_2$—CH=CH—) group, and a vinylorganoxiloxane. These inhibitors for the platinum-based catalyst are described in Japanese Patent Application Kokai Publication No. S52-47053.

(Formulation and Others)

In the composition, the amount of (A2) contained is 0 to 60 parts by weight, relative to 100 parts by weight of the total of (A1) and (A2). When the amount of (A2) contained is more than 60 parts by weight, relative to 100 parts by weight of the total of (A1) and (A2), the fast-curing property of the composition at room temperature is poor. The amount of (A2) contained, relative to 100 parts by weight of the total of (A1) and (A2), is preferably 1 to 60 parts by weight, more preferably 5 to 52 parts by weight, further preferably 5 to 37 parts by weight, and especially preferably 17 to 37 parts by weight. When the amount of (A2) contained is 5 to 37 parts by weight, relative to 100 parts by weight of the total of (A1) and (A2), the adhesive strength is likely to be further improved, and, when the amount of (A2) contained is 17 to 37 parts by weight, it is likely that the elongation of a cured product of the composition as well as the adhesive strength are further improved, so that the stress relaxation property is further improved.

In the composition, the value of $(H_{B1}+H_{B2}+H_{B3})/(Vi_{A1}+Vi_{A2})$ is 0.6 to 2.2. When the value of $(H_{B1}+H_{B2}+H_{B3})/(Vi_{A1}+Vi_{A2})$ is less than 0.6, the composition is cured slowly or is not cured. When the value of $(H_{B1}+H_{B2}+H_{B3})/(Vi_{A1}+Vi_{A2})$ is more than 2.2, a cured product of the composition has poor reliability properties under high-temperature and high-humidity conditions.

A preferred range of the $(H_{B1}+H_{B2}+H_{B3})/(Vi_{A1}+Vi_{A2})$ is from 0.6 to 1.4, from 0.6 to 1.00 or from 0.6 to 0.99, and may be from 0.6 to 0.8 or from 0.7 to 0.8. In the case where the value of $(H_{B1}+H_{B2}+H_{B3})/(Vi_{A1}+Vi_{A2})$ is in the above preferred range, even when a cured product of the composition is heated at a high temperature (for example, heated at 100 to 180° C.), the cured product is likely to have a small change ratio of the flexibility. That is, even when the composition is cured and then further heated at a high temperature, it is likely that there is obtained a cured product which can appropriately relax an external stress to surely obtain a resistance to deformation. Such a cured product has more excellent cold heat cycle reliability. Further, when the value of $(H_{B1}+H_{B2}+H_{B3})/(Vi_{A1}+Vi_{A2})$ is 0.8 or less, a cured product of the composition is likely to have higher elongation.

(Preferred Formulation and Others)

The composition preferably satisfies the followings. In the following description, the wording "when the composition contains (A2)" indicates "when the composition contains (A2) and (B3)", and preferably indicates "when the composition contains (A2) and does not contain (B3)". The wording "when the composition contains (B3)" indicates "when the composition contains (A2) and (B3)", and preferably indicates "when the composition contains (B3) and does not contain (A2)".

When the composition contains (A2), in the composition, the value of $(H_{B1}+H_{B2})/(Vi_{A1}+Vi_{A2})$ is preferably 0.6 to 2.2. When the value of $(H_{B1}+H_{B2})/(Vi_{A1}+Vi_{A2})$ is 0.6 or more, the fast-curing property of the composition is improved. When the value of $(H_{B1}+H_{B2})/(Vi_{A1}+Vi_{A2})$ is 2.2 or less, a cured product of the composition is improved in the reliability properties under high-temperature and high-humidity conditions. The value of $(H_{B1}+H_{B2})/(Vi_{A1}+Vi_{A2})$ is more preferably 0.6 to 1.00, further preferably 0.6 to 0.99, still further preferably 0.6 to 0.8, and especially preferably 0.7 to 0.8. In the case where the value of $(H_{B1}+H_{B2})/(Vi_{A1}+Vi_{A2})$ is in the above preferred range, even when a cured product of the composition is heated at a high temperature, the cured product is likely to have a small change ratio of the flexibility. Further, when the value of $(H_{B1}+H_{B2})/(Vi_{A1}+Vi_{A2})$ is 0.8 or less, a cured product of the composition is likely to have higher elongation.

When the composition contains (A2), from the viewpoint of facilitating control of the density of a three-dimensional structure formed by a crosslinking reaction during the curing of the composition, with respect to (A1) and (A2), it is preferred that a combination of (A1) having a high viscosity (for example, 5,000 to 20,000 mPa·s) and (A2) having a low viscosity (for example, 50 to 1,000 mPa·s) is contained.

When the composition contains (A2), in the composition, the value of $H_{B1}/(H_{B1}+H_{B2})$ is preferably 0.2 to 0.9, more preferably 0.2 to 0.8, and especially preferably 0.3 to 0.8, since it is likely that a cured product of the composition can be obtained, which has a further improved adhesive strength, excellent transparency and less yellowing.

As apparent from the above, when the composition contains (A2), in the composition, it is preferred that the amount of (A2) is 5 to 37 parts by weight, relative to 100 parts by weight of the total of (A1) and (A2), the value of $(H_{B1}+H_{B2})/(Vi_{A1}+Vi_{A2})$ is 0.6 to 0.99, and the value of $H_{B1}/(H_{B1}+H_{B2})$ is 0.3 to 0.8.

When the composition contains (B3), in the composition, the value of $(H_{B1}+H_{B2}+H_{B3})/Vi_{A1}$ is preferably 0.6 to 2.5. When the value of $(H_{B1}+H_{B2}+H_{B3})/Vi_{A1}$ is 0.6 or more, the fast-curing property of the composition is improved. When the value of $(H_{B1}+H_{B2}+H_{B3})/Vi_{A1}$ is 2.5 or less, the occurrence of foaming in a cured product of the composition under high-temperature and high-humidity conditions can be satisfactorily suppressed. The value of $(H_{B1}+H_{B2}+H_{B3})/Vi_{A1}$ is more preferably 0.6 to 2.2, further preferably 0.6 to 2.0, still further preferably 0.6 to 1.4, still further preferably 0.6 to 0.99, and especially preferably 0.8 to 0.99. When the value of $(H_{B1}+H_{B2}+H_{B3})/Vi_{A1}$ is preferably 0.6 to 1.4, and more preferably 0.6 to 0.99, the cured product even after heated at a high temperature is likely to have a small change ratio of the flexibility.

When the composition contains (B3), in the composition, the value of $H_{B3}/(H_{B1}+H_{B2}+H_{B3})$ is preferably 0.1 to 0.9, more preferably 0.15 to 0.5, and especially preferably 0.2 to 0.4. When the value of $H_{B3}/(H_{B1}+H_{B2}+H_{B3})$ is 0.1 or more, the density of a three-dimensional structure formed by a crosslinking reaction during the curing of the composition can be appropriately reduced, so that the stress relaxation property of a cured product of the composition is further improved. When the value of $H_{B3}/(H_{B1}+H_{B2}+H_{B3})$ is 0.9 or less, the fast-curing property of the composition is improved.

When the composition contains (B3), in the composition, the value of $H_{B2}/(H_{B1}+H_{B2}+H_{B3})$ is preferably 0.1 to 0.9, more preferably 0.1 to 0.7, and especially preferably 0.15 to 0.55. When the value of $H_{B2}/(H_{B1}+H_{B2}+H_{B3})$ is 0.1 or more, the fast-curing property of the composition is improved. When the value of $H_{B2}/(H_{B1}+H_{B2}+H_{B3})$ is 0.9 or less, the cured product obtained after heated at a high temperature is improved in flexibility.

From the fact that the cured product even after heated at a high temperature is likely to have excellent stress relaxation property, it is preferred that the composition contains a combination of (A2) and (B3).

When the composition contains (A2), it is preferred that the composition contains an alkenyl group-containing polyorganosiloxane comprising only (A1) and (A2), and, in this case, the composition does not contain an alkenyl group-containing polyorganosiloxane other than (A1) and (A2). When the composition does not contain (A2), it is preferred that the composition contains an alkenyl group-containing polyorganosiloxane comprising only (A1), and, in this case, the composition does not contain an alkenyl group-containing polyorganosiloxane other than (A1).

When the composition contains (B3), it is preferred that the composition contains a polyorganohydrogensiloxane comprising only (B1), (B2) and (B3), and, in this case, the composition does not contain a polyorganohydrogensiloxane other than (B1), (B2) and (B3). When the composition does not contain (B3), it is preferred that the composition contains a polyorganohydrogensiloxane comprising only (B1) and (B2), and, in this case, the composition does not contain a polyorganohydrogensiloxane other than (B1) and (B2).

Therefore, when the composition contains (A2) and (B3), it is preferred that the composition contains an alkenyl group-containing polyorganosiloxane comprising only (A1) and (A2), and a polyorganohydrogensiloxane comprising only (B1), (B2) and (B3). In this case, the composition does not contain an alkenyl group-containing polyorganosiloxane other than (A1) and (A2), and a polyorganohydrogensiloxane other than (B1) and (B2).

From the viewpoint of ensuring an appropriate curing rate, the amount of (C) contained in the composition is preferably 0.1 to 1,000 ppm by weight, and more preferably 0.5 to 200 ppm by weight, based on the total weight of (A1) and (A2), in terms of a metal atom of the platinum group.

The amount of (D) contained in the composition, relative to 100 parts by weight of the total of (A1) and (A2) in the composition, is preferably 50 parts by weight or less, more preferably 30 parts by weight or less, and further preferably 20 parts by weight or less.

The total amount of the additives contained in the composition, relative to 100 parts by weight of the total of (A1), (B1), (B2), and at least one member selected from the group consisting of (A2) and (B3) in the composition, is preferably 100 parts by weight or less, more preferably 30 parts by weight or less, and further preferably 20 parts by weight or less.

The composition can be obtained by blending together (A1), (B1), (B2), at least one member selected from the group consisting of (A2) and (B3), (C), and an arbitrary component. From the viewpoint of easily forming the composition in a uniform state to obtain a transparent cured product, it is preferred that the composition is a two-part composition comprising a first portion which contains "a combination of (A1), (A2) and (C)" or "a combination of (A1) and (C)" and which does not contain (B1), (B2) and (B3), and a second portion which contains (A1), (B1), (B2), and at least one member selected from the group consisting of (A2) and (B3) and which does not contain (C). It is preferred that the first portion and the second portion are mixed each other to form a uniform composition. The arbitrary component can be appropriately added to the composition.

From the viewpoint of the spreadability of the composition being applied, the composition preferably has a viscosity at 23° C. of 100,000 mPa·s or less, and more preferably 50 to 50,000 mPa·s. When the composition is a two-part composition comprising a first portion and a second portion, each viscosity of the first portion and the second portion is preferably 10 to 100,000 mPa·s, more preferably 50 to 50,000 mPa·s, and especially preferably 100 to 20,000 mPa·s.

The composition may be a room temperature curing composition which is curable at room temperature (for example, at 5 to 40° C.). Alternatively, the composition may be a thermosetting resin composition which is cured by heating. The heating temperature can be, for example, higher than 40 to 80° C., and is preferably 60 to 70° C. The heating time can be, for example, 0.5 to 10 hours, and is preferably 0.5 to 2 hours, more preferably 0.5 to 60 minutes, and especially preferably one to less than 30 minutes.

The composition can be used as a sealing agent for an image display device, which comprises the composition. The sealing agent for an image display device is disposed between an image display part and a protective portion and cured by heating, making it possible to seal the image display part and the protective portion. The composition is preferably for adhering a base portion having an image display part for an image display device to a light-transmitting protective portion.

The composition can be suitably used in an image display device, and is particularly preferred as a resin disposed between a protective portion and an image display part for an image display device of a flat panel type. Accordingly, the present invention is directed to an image display device using the composition, specifically, an image display device which has a base portion having an image display part for the image display device and a light-transmitting protective portion, wherein the base portion is adhered to the protective portion using the composition. Specifically, the present invention is directed to an image display device produced by a method for producing an image display device, wherein the method comprises the steps of applying the composition onto a protective panel constituting a transparent protective portion formed from, for example, an optical plastic, then laminating an image display panel constituting an image display part on the protective panel, and heating the composition.

Examples

Hereinbelow, the present invention will be described in more detail with reference to the following Examples and Comparative Examples, which should not be construed as limiting the scope of the present invention. The values for amount are indicated in "part(s) by weight" or "% by weight" unless otherwise specified.

Two-part compositions each comprising (A) and (B) in the Examples and Comparative Examples were individually prepared by mixing together the components having the formulations shown in Tables 1 to 9. In Tables 1 to 9, the "Mix" means an amount relative to the total of "(A)" and "(B)".

The components used are shown below. The characters mean the followings.

M: $(CH_3)_3SiO_{1/2}$
$M^H$: $H(CH_3)_2SiO_{1/2}$
$M^V$: $CH_2=CH(CH_3)_2SiO_{1/2}$
D: $(CH_3)_2SiO_{2/2}$
$D^H$: $H(CH_3)SiO_{2/2}$
Q: $SiO_{4/2}$ (tetrafunctional)

A1-1: Polymethylvinylsiloxane having both ends blocked by $M^V$ units and having an intermediate unit comprising a D unit (Viscosity at 23° C.: 12,200 mPa·s)

a2: Mixture of items (1) to (3) below. In the mixture: A1-2: 25% by weight; A2: 50% by weight; and D1: 25% by weight.

(1) A1-2: Polymethylvinylsiloxane having both ends blocked by $M^V$ units and having an intermediate unit comprising a D unit (Viscosity at 23° C.: 600 mPa·s)

(2) A2: Polymethylvinylsiloxane having one end blocked by an $M^V$ unit and another end blocked by an M unit and having an intermediate unit comprising a D unit (Viscosity at 23° C.: 600 mPa·s)

(3) D1: Polydimethylsiloxane having both ends blocked by M units and having an intermediate unit comprising a D unit (Viscosity at 23° C.: 600 mPa·s)

B1: Linear polymethylhydrogensiloxane represented by $M^HD_{20}M^H$ (Viscosity at 23° C.: 20 mPa·s)

B2: Crosslinkable polymethylbydrogensiloxane having an average unit formula represented by $[H(CH_3)_2SiO_{1/2}]_8$ $[SiO_{4/2}]_4$ (Effective hydrogen content: 1%)

b3: Mixture of items (4) to (6) below. In the mixture: B1-2: 25% by weight; B3: 50% by weight; and D2: 25% by weight.

(4) B1-2: Linear polymethylhydrogensiloxane represented by $M^HD_{20}M^H$ (Viscosity at 23° C.: 20 mPa·s)

(5) B3: Linear polymethylhydrogensiloxane represented by $M^HD_{20}M$ (Viscosity at 23° C.: 20 mPa·s)

(6) D2: Linear polydimethylsiloxane represented by $MD_{20}M$ (Viscosity at 23° C.: 20 mPa·s)

B4: Linear polymethylhydrogensiloxane represented by $MD^H_{17}D_{83}M$ (Viscosity at 23° C.: 120 mPa·s)

C1: Complex which is obtained by heating chloroplatinic acid and 1,3-divinyl-1,1,3,3-tetramethyldisiloxane in a molar ratio of 1:4, and which has a platinum content of 4.9% by weight.

The evaluation of physical properties was conducted as descried below. The results are shown in Tables 1 to 9.

(1) Viscosity

Using a rotational viscometer (Vismetron VDA-L) (manufactured by Shibaura Systems Co., Ltd.), a viscosity (mPa·s) at 23° C. was measured. Other procedures were made in accordance with JIS K 6249 to conduct the measurement.

(2) Tack-Free Time

The composition (A) and the composition (B) were extruded in a volume ratio of 1:1, and while mixing together the extruded compositions using a mixing nozzle, 5 g of the resultant mixture was placed on a flat plate. The time at which the two compositions were in contact each other was set as 0, and a finger which had been cleaned with ethyl alcohol was lightly put on the surface of the mixture, and a period of time required until any sample did not adhere to the finger was determined as a tack-free time.

(3) Penetration 40 ml of an uncured silicone gel composition was placed in a heat-resistant glass beaker having a capacity of 50 ml and heated at 60° C. for 30 minutes to be cured, obtaining a silicone gel. After cooling the silicone gel to room temperature, a penetration (1) before heating treatment was measured in accordance with JIS K 6249 using a ¼ cone. Separately, 40 ml of an uncured silicone gel composition was placed in a heat-resistant glass beaker having a capacity of 50 ml and heated at 60° C. for 30 minutes to be cured, obtaining a silicone gel before heating treatment. Then, the resultant silicone gel was subjected to heating treatment at 150° C. for one hour, obtaining a silicone gel after heating treatment. After cooling the silicone gel to room temperature, a penetration (2) after heating treatment was measured in accordance with JIS K 6249 using a ¼ cone. A penetration change ratio in the heating treatment was determined from the formula (1) shown below. A large penetration means that the cured product has high flexibility and thus has excellent stress relaxation property. A small penetration change ratio means that the cured product after heating treatment has a small change ratio of the flexibility.

Penetration change ratio=(Penetration (1) before heating treatment−Penetration (2) after heating treatment)÷Penetration (1) before heating treatment  Formula (1)

(4) Yellow Index (YI)

As substrates, two glass plates (5 cm×5 cm×1 mm thickness) were used. A spacer was preliminarily disposed between the substrates so that the thickness of the composition became 200 μm. The two glass plates were laminated through the composition so that the composition had a size of 50 mm×50 mm and had a thickness of 200 μm, obtaining a laminate. The laminate was subjected to heat treatment at 25° C. for 30 minutes and at 70° C. for 30 minutes, obtaining an adhesive body having the two substrates adhered to each other through a cured product of the composition. The adhesive body was rendered in a state at 25° C., and then a yellow index, which is an index of the degree of color change, was measured. A yellow index was measured using a spectrophotometer (CM-3500d, manufactured by Konica Minolta, Inc.).

(5) Haze

A specimen was prepared in the same manner as in "(4) Yellow index". With respect to the prepared specimen, a haze was measured in accordance with JIS K 7105 using Haze meter NDH5000 (manufactured by Nippon Denshoku Industries Co., Ltd.).

(6) b* (D65)

A specimen was prepared in the same manner as in "(4) Yellow index". With respect to the prepared specimen, a b* (D65) was measured.

(7) Foaming (7-1) Preparation of Specimen (1)

A specimen was prepared in the same manner as in "(4) Yellow index".

(7-2) Preparation of Specimen (2)

As substrates, two glass plates (5 cm×5 cm×1 mm thickness) were used. A spacer was preliminarily disposed between the substrates so that the thickness of the composition became 200 μm. The two glass plates were laminated through the composition so that the composition had a size of 50 mm×50 mm and had a thickness of 200 μm, obtaining a laminate. The laminate was subjected to heat treatment at 60° C. for 30 minutes, obtaining an adhesive body having the two substrates adhered to each other through a cured product of the composition. The obtained adhesive body was used as a specimen.

(7-3) Foaming Test

The prepared specimens were individually placed in a thermo-hygrostat at 85° C. and at 85% RH for 500 hours, and then visually examined as to whether or not the resin had therein air bubbles. In the tables below, the rating "⅓ Foaming" indicates that air bubbles were confirmed in one specimen among the three specimens.

(8) Glass/Glass Shear Adhesive Strength (MPa) and Elongation (%)

Two glass plates (length: 80 mm; width: 25 mm; thickness: 2 mm) arranged in parallel were laminated through a composition so that the composition had a length of 25 mm, a width of 10 mm and a thickness of 150 μm, and heated at 60° C. for 30 minutes to cure the composition, preparing a test specimen for a shear adhesive strength measurement. The obtained test specimen was pulled in the direction perpendicular to the adhesive surface at a speed of 10 mm/minute to measure an adhesive strength and an elongation.

(9) Cold Heat Cycle Test

As substrates, a glass plate (14 cm×10 cm×1 mm thickness) and PMMA (manufactured by Kuraray Co., Ltd.) (16 cm×11 cm×1 mm thickness) were used. The substrates were laminated through a composition so that the thickness of the composition became 400 μm using a spacer preliminarily disposed between the substrates, obtaining a laminate. The laminate was subjected to heat treatment at 60° C. for 30 minutes, obtaining an adhesive body having the two substrates adhered to each other through a cured product of the composition. The adhesive body was placed in a cold heat cycle machine having one cycle at −40° C. for 30 minutes and at 85° C. for 30 minutes and retained in the machine for 100 cycles. The adhesive body was removed from the machine and visually examined as to whether or not peeling (separation of the substrates) and a crack in the resin occurred. An adhesive body which has suffered no peeling and no formation of a crack in the resin in the cold heat cycle test has excellent reliability under high-temperature and high-humidity conditions. In the tables below, the rating "⅖" indicates that peeling or a crack in the resin was confirmed in two specimens among the five specimens.

The results are summarized below. In Comparative Example 7, $H_{B2}$ is the number for the hydrogen atoms bonded to the silicon atoms of B4.

TABLE 1

|  | Example 1 | | | Example 2 | | | Example 3 | | |
| --- | --- | --- | --- | --- | --- | --- | --- | --- | --- |
|  | (A) | (B) | Mix | (A) | (B) | Mix | (A) | (B) | Mix |
| A1-1 | 45.988 | 52.08 | 49.034 | 45.988 | 54.5 | 50.244 | 45.988 | 56.94 | 51.464 |
| a2 | 54 | 38 | 46 | 54 | 38 | 46 | 54 | 38 | 46 |
| B1 |  | 9 | 4.5 |  | 6.8 | 3.4 |  | 4.6 | 2.3 |
| B2 |  | 0.92 | 0.46 |  | 0.7 | 0.35 |  | 0.46 | 0.23 |
| C1 | 0.012 |  | 0.008 | 0.012 |  | 0.006 | 0.012 |  | 0.006 |
| Total | 100 | 100 | 100 | 100 | 100 | 100 | 100 | 100 | 100 |
| Pt Content (ppm) | 5.9 | 0.0 | 2.9 | 5.9 | 0.0 | 2.9 | 5.9 | 0.0 | 2.9 |
| $(H_{B1} + H_{B2} + H_{B3})/(Vi_{A1} + Vi_{A2})$ |  |  | 2.00 |  |  | 1.50 |  |  | 0.99 |
| $H_{B1} + H_{B2}$ (mmol) |  |  | 10.85 |  |  | 8.22 |  |  | 5.50 |
| $Vi_{A1} + Vi_{A2}$ (mmol) |  |  | 5.42 |  |  | 5.49 |  |  | 5.56 |
| Weight of A2, relative to 100 parts of total of A1 and A2 |  |  | 28 |  |  | 27 |  |  | 27 |
| $H_{B1}/(H_{B1} + H_{B2})$ |  |  | 0.58 |  |  | 0.58 |  |  | 0.59 |
| Viscosity (mPa · s) | 3350 | 3240 |  | 3350 | 3580 |  | 3350 | 4060 |  |
| Tack-free time |  |  | 2'20 |  |  | 3'20 |  |  | 6'20 |
| Penetration (1) before heating treatment |  |  | 39 |  |  | 42 |  |  | 28 |
| Penetration (2) after heating treatment |  |  | 14 |  |  | 16 |  |  | 26 |
| Penetration change ratio (%) |  |  | 84 |  |  | 62 |  |  | 7 |
| Haze |  |  | 0.01 |  |  | 0.02 |  |  | 0.03 |
| YI |  |  | 0.28 |  |  | 0.07 |  |  | 0.08 |
| b* |  |  | 0.17 |  |  | 0.07 |  |  | 0.06 |
| Foaming (Specimen 1) |  |  | No |  |  | No |  |  | No |
| Cold heat cycle (100 Cycles) |  |  | 0/5 |  |  | 0/5 |  |  | 0/5 |

TABLE 1-continued

|  | Example 1 | | | Example 2 | | | Example 3 | | |
| --- | --- | --- | --- | --- | --- | --- | --- | --- | --- |
|  | (A) | (B) | Mix | (A) | (B) | Mix | (A) | (B) | Mix |
| Glass/glass shear adhesive strength (MPa) |  |  | 0.18 |  |  | 0.23 |  |  | 0.28 |
| Glass/glass shear elongation(%) |  |  | 58 |  |  | 64 |  |  | 57 |

TABLE 2

|  | Example 4 | | | Example 5 | | | Example 6 | | |
| --- | --- | --- | --- | --- | --- | --- | --- | --- | --- |
|  | (A) | (B) | Mix | (A) | (B) | Mix | (A) | (B) | Mix |
| A1-1 | 45.988 | 57.92 | 51.954 | 45.988 | 58.46 | 52.224 | 45.988 | 59.52 | 52.754 |
| a2 | 54 | 38 | 46 | 54 | 38 | 46 | 54 | 38 | 46 |
| B1 |  | 3.7 | 1.85 |  | 3.2 | 1.6 |  | 1.58 | 0.79 |
| B2 |  | 0.38 | 0.19 |  | 0.34 | 0.17 |  | 0.9 | 0.45 |
| C1 | 0.012 |  | 0.006 | 0.012 |  | 0.006 | 0.012 |  | 0.006 |
| Total | 100 | 100 | 100 | 100 | 100 | 100 | 100 | 100 | 100 |
| Pt Content (ppm) | 5.9 | 0.0 | 2.9 | 5.9 | 0.0 | 2.9 | 5.9 | 0.0 | 2.9 |
| $(H_{B1} + H_{B2} + H_{B3})/(Vi_{A1} + Vi_{A2})$ |  |  | 0.80 |  |  | 0.70 |  |  | 0.98 |
| $H_{B1} + H_{B2}$ (mmol) |  |  | 4.47 |  |  | 3.92 |  |  | 5.52 |
| $Vi_{A1} + Vi_{A2}$ (mmol) |  |  | 5.59 |  |  | 5.60 |  |  | 5.64 |
| Weight of A2, relative to 100 parts of total of A1 and A2 |  |  | 27 |  |  | 27 |  |  | 26 |
| $H_{B1}/(H_{B1} + H_{B2})$ |  |  | 0.58 |  |  | 0.58 |  |  | 0.20 |
| Viscosity (mPa · s) | 3350 | 4260 |  | 3350 | 4400 |  | 3350 | 4600 |  |
| Tack-free time |  |  | 9'00 |  |  | 12'00 |  |  | 3'30 |
| Penetration (1) before heating treatment |  |  | 64 |  |  | 91 |  |  | 13 |
| Penetration (2) after heating treatment |  |  | 54 |  |  | 77 |  |  | 10 |
| Penetration change ratio (%) |  |  | 16 |  |  | 15 |  |  | 23 |
| Haze |  |  | 0.04 |  |  | 0.04 |  |  | 0.04 |
| YI |  |  | 0.21 |  |  | 0.21 |  |  | 0.23 |
| b * |  |  | 0.13 |  |  | 0.13 |  |  | 0.15 |
| Foaming (Specimen 1) |  |  | No |  |  | No |  |  | No |
| Cold heat cycle (100 Cycles) |  |  | 0/5 |  |  | 0/5 |  |  | 0/5 |
| Glass/glass shear adhesive strength (MPa) |  |  | 0.1 |  |  | 0.03 |  |  | 0.2 |
| Glass/glass shear elongation(%) |  |  | 72 |  |  | 80 |  |  | 32 |

TABLE 3

|  | Example 7 | | | Example 8 | | | Example 9 | | |
| --- | --- | --- | --- | --- | --- | --- | --- | --- | --- |
|  | (A) | (B) | Mix | (A) | (B) | Mix | (A) | (B) | Mix |
| A1-1 | 45.988 | 54.89 | 50.439 | 89.988 | 84.93 | 87.459 | 19.988 | 14.94 | 17.464 |
| a2 | 54 | 38 | 46 | 10 | 10 | 10 | 80 | 80 | 80 |
| B1 |  | 7 | 3.5 |  | 4.6 | 2.3 |  | 4.6 | 2.3 |
| B2 |  | 0.11 | 0.055 |  | 0.47 | 0.235 |  | 0.46 | 0.23 |
| C1 | 0.012 |  | 0.006 | 0.012 |  | 0.006 | 0.012 |  | 0.006 |
| Total | 100 | 100 | 100 | 100 | 100 | 100 | 100 | 100 | 100 |
| Pt Content (ppm) | 5.9 | 0.0 | 2.9 | 5.9 | 0.0 | 2.9 | 5.9 | 0.0 | 2.9 |
| $(H_{B1} + H_{B2} + H_{B3})/(Vi_{A1} + Vi_{A2})$ |  |  | 1.00 |  |  | 0.98 |  |  | 1.00 |
| $H_{B1} + H_{B2}$ (mmol) |  |  | 5.47 |  |  | 5.55 |  |  | 5.50 |
| $Vi_{A1} + Vi_{A2}$ (mmol) |  |  | 5.50 |  |  | 5.63 |  |  | 5.49 |
| Weight of A2, relative to 100 parts of total of A1 and A2 |  |  | 27 |  |  | 5 |  |  | 52 |
| $H_{B1}/(H_{B1} + H_{B2})$ |  |  | 0.90 |  |  | 0.58 |  |  | 0.59 |
| Viscosity (mPa · s) | 3350 | 3680 |  | 10400 | 8340 |  | 1570 | 1170 |  |
| Tack-free time |  |  | 12'00 |  |  | 3'20 |  |  | 11'00 |
| Penetration (1) before heating treatment |  |  | 124 |  |  | 11 |  |  | 90 |
| Penetration (2) after heating treatment |  |  | 112 |  |  | 8 |  |  | 84 |
| Penetration change ratio (%) |  |  | 10 |  |  | 27 |  |  | 7 |
| Haze |  |  | 0.04 |  |  | 0.05 |  |  | 0.01 |
| YI |  |  | 0.24 |  |  | 0.28 |  |  | 0.1 |
| b * |  |  | 0.13 |  |  | 0.17 |  |  | 0.07 |
| Foaming (Specimen 1) |  |  | No |  |  | No |  |  | No |
| Cold heat cycle (100 Cycles) |  |  | 0/5 |  |  | 0/5 |  |  | 0/5 |

TABLE 3-continued

|  | Example 7 | | | Example 8 | | | Example 9 | | |
| --- | --- | --- | --- | --- | --- | --- | --- | --- | --- |
|  | (A) | (B) | Mix | (A) | (B) | Mix | (A) | (B) | Mix |
| Glass/glass shear adhesive strength (MPa) |  |  | 0.02 |  |  | 0.2 |  |  | 0.05 |
| Glass/glass shear elongation (%) |  |  | 110 |  |  | 36 |  |  | 43 |

TABLE 4

|  | Comparative Example 1 | | | Comparative Example 2 | | | Comparative Example 3 | | |
| --- | --- | --- | --- | --- | --- | --- | --- | --- | --- |
|  | (A) | (B) | Mix | (A) | (B) | Mix | (A) | (B) | Mix |
| A1-1 | 45.988 | 59.47 | 52.729 | 45.988 | 49.9 | 47.944 | 45.988 | 60.84 | 53.414 |
| a2 | 54 | 38 | 46 | 54 | 38 | 46 | 54 | 38 | 46 |
| B1 |  | 2.3 | 1.15 |  | 11 | 5.5 |  | 0 |  |
| B2 |  | 0.23 | 0.115 |  | 1.1 | 0.55 |  | 1.16 | 0.58 |
| B4 |  |  |  |  |  |  |  |  |  |
| C1 | 0.012 |  | 0.006 | 0.012 |  | 0.006 | 0.012 |  | 0.008 |
| Total | 100 | 100 | 100 | 100 | 100 | 100 | 100 | 100 | 100 |
| Pt Content (ppm) | 5.9 | 0.0 | 2.9 | 5.9 | 0.0 | 2.9 | 5.9 | 0.0 | 2.9 |
| $(H_{B1} + H_{B2} + H_{B3})/(Vi_{A1} + Vi_{A2})$ |  |  | 0.49 |  |  | 2.45 |  |  | 1.00 |
| $H_{B1} + H_{B2}$ (mmol) |  |  | 2.75 |  |  | 13.15 |  |  | 5.68 |
| $Vi_{A1} + Vi_{A2}$ (mmol) |  |  | 5.63 |  |  | 5.36 |  |  | 5.67 |
| Weight of A2, relative to 100 parts of total of A1 and A2 |  |  | 26 |  |  | 28 |  |  | 26 |
| $H_{B1}/(H_{B1} + H_{B2})$ |  |  | 0.59 |  |  | 0.59 |  |  | 0.00 |
| Viscosity (mPa·s) | 3350 | 4800 |  | 3350 | 2870 |  | 3350 | 4930 |  |
| Tack-free time |  |  | 30 min or more |  |  | 2'00 |  |  | 3'00 |
| Penetration (1) before heating treatment |  |  | Uncured |  |  | 38 |  |  | 6 |
| Penetration (2) after heating treatment |  |  | Uncured |  |  | 14 |  |  | 3 |
| Penetration change ratio (%) |  |  | Uncured |  |  | 63 |  |  | 50 |
| Haze |  |  | Uncured |  |  | 0.02 |  |  | 0.04 |
| YI |  |  | Uncured |  |  | 0.27 |  |  | 0.27 |
| b* |  |  | Uncured |  |  | 0.16 |  |  | 0.17 |
| Foaming (Specimen 1) |  |  | Uncured |  |  | 3/3 Foaming |  |  | No |
| Cold heat cycle (100 Cycles) |  |  | Uncured |  |  | 0/5 |  |  | 0/5 |
| Glass/glass shear adhesive strength (MPa) |  |  | Uncured |  |  | 0.25 |  |  | 0.31 |
| Glass/glass shear elongation (%) |  |  | Uncured |  |  | 60 |  |  | 8 |

TABLE 5

|  | Comparative Example 4 | | | Comparative Example 5 | | | Comparative Example 6 | | | Comparative Example 7 | | |
| --- | --- | --- | --- | --- | --- | --- | --- | --- | --- | --- | --- | --- |
|  | (A) | (B) | Mix | (A) | (B) | Mix | (A) | (B) | Mix | (A) | (B) | Mix |
| A1-1 | 45.998 | 54.2 | 50.094 | 99.988 | 94.82 | 97.404 |  |  |  | 45.988 | 55.7 | 50.844 |
| a2 | 54 | 38 | 46 |  |  |  | 99.988 | 94.93 | 97.459 | 54 | 38 | 46 |
| B1 |  | 7.8 | 3.9 |  | 4.7 | 2.35 |  | 4.8 | 2.3 |  | 4.6 | 2.3 |
| B2 |  |  |  |  | 0.48 | 0.24 |  | 0.47 | 0.235 |  |  |  |
| B4 |  |  |  |  |  |  |  |  |  |  | 1.7 | 0.85 |
| C1 | 0.012 |  | 0.006 | 0.012 |  | 0.006 | 0.012 |  | 0.006 | 0.012 |  | 0.006 |
| Total | 100 | 100 | 100 | 100 | 100 | 100 | 100 | 100 | 100 | 100 | 100 | 100 |
| Pt Content (ppm) | 5.9 | 0.0 | 2.9 | 5.9 | 0.0 | 2.9 | 5.9 | 0.0 | 2.9 | 5.9 | 0.0 | 2.9 |
| $(H_{B1} + H_{B2} + H_{B3})/(Vi_{A1} + Vi_{A2})$ |  |  | 1.00 |  |  | 1.00 |  |  | 1.60 |  |  | 1.02 |
| $H_{B1} + H_{B2}$ (mmol) |  |  | 5.50 |  |  | 5.67 |  |  | 8.74 |  |  | 5.62 |
| $Vi_{A1} + Vi_{A2}$ (mmol) |  |  | 5.48 |  |  | 5.65 |  |  | 5.46 |  |  | 5.52 |
| Weight of A2, relative to 100 parts of total of A1 and A2 |  |  | 27 |  |  | 0 |  |  | 67 |  |  | 27 |
| $H_{B1}/(H_{B1} + H_{B2})$ |  |  | 1.00 |  |  | 0.58 |  |  | 0.37 |  |  | 0.58 |
| Viscosity (mPa·s) | 3350 | 3570 |  | 12680 | 10400 |  | 840 | 730 |  | 3350 | 3800 |  |
| Tack-free time |  |  | 30 min or more |  |  | 2'30 |  |  | 30 min or more |  |  | 30 min or more |

TABLE 5-continued

|  | Comparative Example 4 | | | Comparative Example 5 | | | Comparative Example 6 | | | Comparative Example 7 | | |
| --- | --- | --- | --- | --- | --- | --- | --- | --- | --- | --- | --- | --- |
|  | (A) | (B) | Mix | (A) | (B) | Mix | (A) | (B) | Mix | (A) | (B) | Mix |
| Penetration (1) before heating treatment | | | Uncured | | | 6 | | | Uncured | | | 30 |
| Penetration (2) after heating treatment | | | Uncured | | | 3 | | | Uncured | | | 20 |
| Penetration change ratio (%) | | | Uncured | | | 50 | | | Uncured | | | 33 |
| Haze | | | Uncured | | | 0.04 | | | Uncured | | | 0.08 |
| YI | | | Uncured | | | 0.19 | | | Uncured | | | 0.13 |
| b * | | | Uncured | | | 0.13 | | | Uncured | | | 0.09 |
| Foaming (Specimen 1) | | | Uncured | | | No | | | Uncured | | | 1/3 Foaming |
| Cold heat cycle (100 Cycles) | | | Uncured | | | 0/5 | | | Uncured | | | 0/5 |
| Glass/glass shear adhesive strength(MPa) | | | Uncured | | | 0.32 | | | Uncured | | | 0.32 |
| Glass/glass shear elongation (%) | | | Uncured | | | 8 | | | Uncured | | | 46 |

TABLE 6

|  | Example 10 | | | Example 11 | | | Example 12 | | | Example 13 | | |
| --- | --- | --- | --- | --- | --- | --- | --- | --- | --- | --- | --- | --- |
|  | (A) | (B) | Mix | (A) | (B) | Mix | (A) | (B) | Mix | (A) | (B) | Mix |
| A1-1 | 99.988 | 95 | 97.494 | 99.988 | 89.45 | 94.719 | 99.988 | 90.8 | 95.394 | 99.988 | 83.5 | 91.814 |
| B1-1 | | | 0 | | | 0 | | | 0 | | | 0 |
| B2 | | 0.6 | 0.3 | | 0.35 | 0.175 | | 0.6 | 0.3 | | 0.35 | 0.18 |
| b3 | | 4.4 | 2.2 | | 10.2 | 5.1 | | 8.6 | 4.3 | | 16 | 8 |
| B4 | | | | | | | | | | | | |
| C1 | 0.012 | | 0.006 | 0.012 | | 0.006 | 0.012 | | 0.006 | 0.012 | | 0.006 |
| Total | 100 | 100 | 100 | 100 | 100 | 100 | 100 | 100 | 100 | 100 | 100 | 100 |
| Pt Content (ppm) | 5.9 | 0.0 | 2.9 | 5.9 | 0.0 | 2.9 | 5.9 | 0.0 | 2.9 | 5.9 | 0.0 | 2.9 |
| $(H_{B1} + H_{B2} + H_{B3})/(Vi_{A1} + Vi_{A2})$ | | | 0.60 | | | 0.70 | | | 0.80 | | | 0.99 |
| $H_{B1} + H_{B2} + H_{B3}$ (mmol) | | | 4.31 | | | 4.89 | | | 5.62 | | | 6.75 |
| $Vi_{A1}$ (mmol) | | | 7.21 | | | 7.01 | | | 7.06 | | | 6.79 |
| Weight of A2, relative to 100 parts of total of A1 and A2 | | | 0 | | | 0 | | | 0 | | | 0 |
| $H_{B2}/(H_{B1} + H_{B2} + H_{B3})$ | | | 0.68 | | | 0.35 | | | 0.52 | | | 0.26 |
| $H_{B3}/(H_{B1} + H_{B2} + H_{B3})$ | | | 0.16 | | | 0.32 | | | 0.24 | | | 0.37 |
| Viscosity (mPa · s) | 3600 | 3070 | | 3600 | 2500 | | 3600 | 2640 | | 3600 | 2050 | |
| Tack-free time | | | 4'40 | | | 7'30 | | | 3'30 | | | 4'40 |
| Penetration (1) before heating treatment | | | 52 | | | 102 | | | 32 | | | 59 |
| Penetration (2) after heating treatment | | | 47 | | | 95 | | | 27 | | | 53 |
| Penetration change ratio ((1) − (2))/(1) | | | 9.6 | | | 6.9 | | | 15.6 | | | 10.2 |
| Haze | | | 0.01 | | | 0.01 | | | 0.03 | | | 0.05 |
| YI | | | 0.03 | | | 0.03 | | | 0.04 | | | 0.03 |
| b * | | | 0.02 | | | 0.01 | | | 0.03 | | | 0.01 |
| Foaming (Specimen 2) | | | No | | | No | | | No | | | No |
| Cold heat cycle (100 Cycles) | | | 0/5 | | | 0/5 | | | 0/5 | | | 0/5 |
| Glass/glass shear adhesive strength(MPa) | | | 0.26 | | | 0.04 | | | 0.43 | | | 0.26 |
| Glass/glass shear elongation (%) | | | 28 | | | 30 | | | 26 | | | 33 |

TABLE 7

|  | Example 14 | | | Example 15 | | | Example 16 | | |
| --- | --- | --- | --- | --- | --- | --- | --- | --- | --- |
|  | (A) | (B) | Mix | (A) | (B) | Mix | (A) | (B) | Mix |
| A1 | 99.98 | 80.8 | 90.37 | 99.988 | 82.42 | 91.204 | 99.988 | 75.8 | 87.894 |
| B1-1 | | | 0 | | 5.7 | 2.85 | | | 0 |
| B2 | | 0.44 | 0.22 | | 0.38 | 0.19 | | 1.2 | 0.6 |
| b3 | | 18.8 | 9.4 | | 11.5 | 5.75 | | 23 | 11.5 |
| B4 | | | | | | | | | |
| C1 | 0.02 | | 0.01 | 0.012 | | 0.006 | 0.012 | | 0.006 |
| Total | 100 | 100 | 100 | 100 | 100 | 100 | 100 | 100 | 100 |
| Pt Content (ppm) | 9.8 | 0.0 | 4.9 | 5.9 | 0.0 | 2.9 | 5.9 | 0.0 | 2.9 |
| $(H_{B1} + H_{B2} + H_{B3})/(Vi_{A1} + Vi_{A2})$ | | | 1.20 | | | 1.40 | | | 2.01 |
| $H_{B1} + H_{B2} + H_{B3}$ (mmol) | | | 8.01 | | | 9.46 | | | 13.04 |

TABLE 7-continued

|  | Example 14 | | | Example 15 | | | Example 16 | | |
| --- | --- | --- | --- | --- | --- | --- | --- | --- | --- |
|  | (A) | (B) | Mix | (A) | (B) | Mix | (A) | (B) | Mix |
| $Vi_{A1}$ (mmol) |  |  | 6.69 |  |  | 6.75 |  |  | 6.50 |
| Weight of A2, relative to 100 parts of total of A1 and A2 |  |  | 0 |  |  | 0 |  |  | 0 |
| $H_{B2}/(H_{B1} + H_{B2} + H_{B3})$ |  |  | 0.27 |  |  | 0.20 |  |  | 0.45 |
| $H_{B3}/(H_{B1} + H_{B2} + H_{B3})$ |  |  | 0.37 |  |  | 0.19 |  |  | 0.27 |
| Viscosity (mPa · s) | 3600 | 1900 |  | 3600 | 2000 |  | 3600 | 1580 |  |
| Tack-free time |  |  | 4'00 |  |  | 3'30 |  |  | 2'00 |
| Penetration (1) before heating treatment |  |  | 58 |  |  | 58 |  |  | 20 |
| Penetration (2) after heating treatment |  |  | 48 |  |  | 21 |  |  | 12 |
| Penetration change ratio ((1) − (2))/(1) |  |  | 17.2 |  |  | 63.8 |  |  | 40.0 |
| Haze |  |  | 0.01 |  |  | 0.01 |  |  | 0.04 |
| YI |  |  | 0.08 |  |  | 0.05 |  |  | 0.06 |
| b * |  |  | 0.04 |  |  | 0.02 |  |  | 0.04 |
| Foaming (Specimen 2) |  |  | No |  |  | No |  |  | No |
| Cold heat cycle (100 Cycles) |  |  | 0/5 |  |  | 0/5 |  |  | 0/5 |
| Glass/glass shear adhesive strength (MPa) |  |  | 0.22 |  |  | 0.29 |  |  | 0.24 |
| Glass/glass shear elongation (%) |  |  | 29 |  |  | 37 |  |  | 16 |

TABLE 8

|  | Comparative Example 8 | | | Comparative Example 9 | | | Comparative Example 10 | | | Comparative Example 11 | | |
| --- | --- | --- | --- | --- | --- | --- | --- | --- | --- | --- | --- | --- |
|  | (A) | (B) | Mix | (A) | (B) | Mix | (A) | (B) | Mix | (A) | (B) | Mix |
| A1 | 99.988 | 98.8 | 99.394 | 99.988 | 65.3 | 82.644 | 99.988 | 99.6 | 99.794 | 99.988 | 91 | 95.494 |
| B1-1 |  |  | 0 |  |  | 0 |  | 8 | 4 |  | 8 | 4 |
| B2 |  | 0.2 | 0.1 |  | 1.7 | 0.85 |  | 0.4 | 0.2 |  |  | 0 |
| b3 |  | 1 | 0.5 |  | 33 | 16.5 |  |  | 0 |  |  | 0 |
| B4 |  |  |  |  |  |  |  |  | 0 |  | 1 | 0.5 |
| C1 | 0.012 |  | 0.006 | 0.012 |  | 0.006 | 0.012 |  | 0.006 | 0.012 |  | 0.006 |
| Total | 100 | 100 | 100 | 100 | 100 | 100 | 100 | 108 | 104 | 100 | 100 | 100 |
| Pt Content (ppm) | 5.9 | 0.0 | 2.9 | 5.9 | 0.0 | 2.9 | 5.9 | 0.0 | 2.9 | 5.9 | 0.0 | 2.9 |
| $(H_{B1} + H_{B2} + H_{B3})/(Vi_{A1} + Vi_{A2})$ |  |  | 0.18 |  |  | 3.04 |  |  | 1.03 |  |  | 1.00 |
| $H_{B1} + H_{B2} + H_{B3}$ (mmol) |  |  | 1.29 |  |  | 18.61 |  |  | 7.60 |  |  | 7.04 |
| $Vi_{A1}$ (mmol) |  |  | 7.36 |  |  | 6.12 |  |  | 7.38 |  |  | 7.07 |
| Weight of A2, relative to 100 parts of total of A1 and A2 |  |  | 0 |  |  | 0 |  |  | 0 |  |  | 0 |
| $H_{B2}/(H_{B1} + H_{B2} + H_{B3})$ |  |  | 0.76 |  |  | 0.45 |  |  | — |  |  | — |
| $H_{B3}/(H_{B1} + H_{B2} + H_{B3})$ |  |  | 0.12 |  |  | 0.28 |  |  | 0.00 |  |  | 0.00 |
| Viscosity (mPa · s) | 3600 | 3500 |  | 3600 | 1060 |  | 3600 | 2840 |  | 3600 | 2600 |  |
| Tack-free time |  |  | 30 min or more |  |  | 1'20 |  |  | 5'00 |  |  | 30 min or more |
| Penetration (1) before heating treatment |  |  | Uncured |  |  | 22 |  |  | 7 |  |  | 18 |
| Penetration (2) after heating treatment |  |  | Uncured |  |  | 8 |  |  | 3 |  |  | 7 |
| Penetration change ratio ((1) − (2))/(1) |  |  | Uncured |  |  | 63.6 |  |  | 57.1 |  |  | 61.1 |
| Haze |  |  | Uncured |  |  | 0.03 |  |  | 0.03 |  |  | 0.02 |
| YI |  |  | Uncured |  |  | 0.03 |  |  | 0.06 |  |  | 0.03 |
| b * |  |  | Uncured |  |  | 0.02 |  |  | 0.02 |  |  | 0.02 |
| Foaming (Specimen 2) |  |  | Uncured |  |  | 3/3 Foaming |  |  | No |  |  | 1/3 Foaming |
| Cold heat cycle (100 Cycles) |  |  | Uncured |  |  | 5/5 |  |  | 5/5 |  |  | 2/5 |
| Glass/glass shear adhesive strength (MPa) |  |  | Uncured |  |  | 0.21 |  |  | 0.24 |  |  | 0.23 |
| Glass/glass shear elongation (%) |  |  | Uncured |  |  | 15 |  |  | 11 |  |  | 17 |

TABLE 9

| | Example 17 | | | Example 18 | | |
| --- | --- | --- | --- | --- | --- | --- |
| | (A) | (B) | Mix | (A) | (B) | Mix |
| A1-1 | 45.988 | 55.73 | 50.859 | 89.988 | 83.4 | 86.694 |
| a2 | 54 | 38 | 46 | 10 | 10 | 10 |
| B1-1 | | 1.9 | 0.95 | | 2 | 1 |
| B2 | | 0.47 | 0.235 | | 0.5 | 0.25 |
| b3 | | 3.9 | 1.95 | | 4.1 | 2.05 |
| C1 | 0.012 | | 0.006 | 0.012 | | 0.006 |
| Total | 100 | 100 | 100 | 100 | 100 | 100 |
| Pt Content (ppm) | 5.9 | 0 | 2.9 | | | 2.9 |
| $(H_{B1} + H_{B2} + H_{B3})/(Vi_{A1} + Vi_{A2})$ | | | 0.98 | | | 0.97 |
| $H_{B1} + H_{B2} + H_{B3}/Vi_{A1}$ | | | 1.25 | | | 1.02 |
| $H_{B1} + H_{B2} + H_{B3}$ (mmol) | | | 4.81 | | | 5.09 |
| $Vi_{A1} + Vi_{A2}$ (mmol) | | | 4.91 | | | 5.23 |
| $Vi_{A1}$ (mmol) | | | 3.86 | | | 5.00 |
| $H_{B1} + H_{B2}$ (mmol) | | | 4.21 | | | 4.45 |
| $(H_{B1} + H_{B2})/(Vi_{A1} + Vi_{A2})$ | | | 0.86 | | | 0.85 |
| Weight of A2, relative to 100 parts of total of A1 and A2 | | | 27 | | | 5 |
| $H_{B1}/(H_{B1} + H_{B2})$ | | | 0.43 | | | 0.43 |
| $H_{B2}/(H_{B1} + H_{B2} + H_{B3})$ | | | 0.5 | | | 0.5 |
| $H_{B3}/(H_{B1} + H_{B2} + H_{B3})$ | | | 0.13 | | | 0.13 |
| Viscosity mPa | 3630 | 4120 | | 11060 | 4200 | |
| Tack-free time | | | 10'00 | | | 5'00 |
| Penetration (1) before heating treatment | | | 46 | | | 12 |
| Penetration (2) after heating treatment | | | 44 | | | 12 |
| Penetration change ratio ((1) − (2))/(1) | | | 4.3 | | | 0.0 |
| Haze | | | 0.05 | | | 0.05 |
| YI | | | 0.04 | | | 0.1 |
| b * | | | 0.03 | | | 0.05 |
| Foaming (Specimen 2) | | | No | | | No |
| Cold heat cycle (100 Cycles) | | | 0/5 | | | 0/5 |
| Glass/glass shear adhesive strength(MPa) | | | 0.35 | | | 0.53 |
| Glass/glass shear elongation(%) | | | 30 | | | 24 |

The compositions in Examples 1 to 9 contain (A2) and do not contain (B3). The compositions in Examples 10 to 16 contain (B3) and do not contain (A2). The compositions in Examples 17 and 18 contain both (A2) and (B3).

Each of the compositions in the Examples had excellent fast-curing property at room temperature, and the composition after cured had high elongation, excellent stress relaxation property, excellent reliability properties under high-temperature and high-humidity conditions, and excellent cold heat cycle reliability.

A comparison was made between Examples 1 and 2 and Examples 3 to 5. With respect to the cured products having almost the same weight of (A2), relative to 100 parts by weight of the total of (A1) and (A2), and having almost the same value of $H_{B1}/(H_{B1}+H_{B2})$, the cured products in Examples 3 to 5, in which the value of $(H_{B1}+H_{B2}+H_{B3})/(Vi_{A1}+Vi_{A2})$ (i.e., $(H_{B1}+H_{B2})/(Vi_{A1}+Vi_{A2})$) was 0.99 or less, had a small penetration change ratio, and excellent stress relaxation property even after the heating treatment. Further, a comparison was made between Example 3 and Examples 4 and 5. The cured products in Examples 4 and 5, in which the value of $(H_{B1}+H_{B2}+H_{B3})/(Vi_{A1}+Vi_{A2})$ (i.e., $(H_{B1}+H_{B2})/(Vi_{A1}+Vi_{A2})$) was 0.8 or less, had a higher elongation.

A comparison was made between Example 3 and Examples 6 and 7. With respect to the cured products having almost the same weight of (A2), relative to 100 parts by weight of the total of (A1) and (A2), and having almost the same value of $(H_{B1}+H_{B2}+H_{B3})/(Vi_{A1}+Vi_{A2})$ (i.e., $(H_{B1}+H_{B2})/(Vi_{A1}+Vi_{A2})$), the cured product in Example 3, in which the value of $H_{B1}/(H_{B1}+H_{B2})$ was in an especially preferred range, was further improved in the adhesive strength. Further, with respect to the compositions in Examples 6 and 7 in which the value of $(H_{B1}+H_{B2}+H_{B3})/(Vi_{A1}+Vi_{A2})$ (i.e., $(H_{B1}+H_{B2})/(Vi_{A1}+Vi_{A2})$) is changed to be almost the same as that in the compositions in Examples 4 and 5, it is presumed that cured products obtained from the compositions in Examples 4 and 5 have a further improved adhesive strength. A comparison was made between Examples 3 to 8 and Example 9. With respect to the cured products having almost the same value of $H_{B1}/(H_{B1}+H_{B2})$ and having almost the same value of $(H_{B1}+H_{B2}+H_{B3})/(Vi_{A1}+Vi_{A2})$ (i.e., $(H_{B1}+H_{B2})/(Vi_{A1}+Vi_{A2})$), in the case where the weight of (A2), relative to 100 parts by weight of the total of (A1) and (A2), was in a further preferred range, the adhesive strength was further improved, and, in the case where the weight of (A2) was in an especially preferred range, the adhesive strength was further improved and the elongation was further improved.

In Comparative Example 1, the value of $(H_{B1}+H_{B2}+H_{B3})/(Vi_{A1}+Vi_{A2})$ was less than 0.6, and therefore curing at room temperature was slow.

In Comparative Example 2, the value of $(H_{B1}+H_{B2}+H_{B3})/(Vi_{A1}+Vi_{A2})$ was more than 2.2, and therefore air bubbles in the cured product were confirmed, and the occurrence of peeling and a crack in the resin was observed in all the test specimens after the cold heat cycle test, and thus the reliability under high-temperature and high-humidity conditions was poor.

In Comparative Example 3, (B1) was not contained, and therefore a cured product having poor stress relaxation property and a small elongation was obtained.

In Comparative Example 4, (B2) was not contained, and therefore curing at room temperature was slow.

In Comparative Example 5, both (A2) and (B3) were not contained, and therefore a cured product having poor stress relaxation property and a small elongation was obtained.

In Comparative Example 6, the weight of (A2), relative to 100 parts by weight of the total of (A1) and (A2), was more than 60 parts by weight, and therefore curing at room temperature was slow.

In Comparative Example 7, instead of (B2), a linear polyorganohydrogensiloxane having a hydrogen atom bonded to the silicon atom in the intermediate unit was used, and therefore curing at room temperature was slow. In addition, in Comparative Example 7, air bubbles in the cured product were confirmed.

A comparison was made between Examples 10 to 15 and Example 16. In the case where the value of $(H_{B1}+H_{B2}+H_{B3})/(Vi_{A1}+Vi_{A2})$ (i.e., $(H_{B1}+H_{B2}+H_{B3})/Vi_{A1}$) is 0.6 to 1.4, the stress relaxation property was further improved, and the occurrence of peeling and a crack in the resin was not found at all after the cold heat cycle test, and thus the reliability properties after the cold heat cycle test were further improved. In Example 7, in four test specimens after the cold heat cycle test, the occurrence of peeling and a crack in the resin was not found. In Example 16, in one test specimen after the cold heat cycle test, slight peeling occurred at the corner of the test specimen, but a number of air bubbles or cracks were not observed in the test specimen. In contrast, in the Comparative Examples, a number of air bubbles and cracks were observed in all the test specimens.

A comparison was made between Examples 10 to 13 and Examples 14 to 16. In the case where the value of $(H_{B1}+$ $H_{B2}+H_{B3})/(Vi_{A1}+Vi_{A2})$ (i.e., $(H_{B1}+H_{B2}+H_{B3})/Vi_{A1})$ was 0.6 to 0.99, a lowering of the flexibility of the cured product after the heating treatment was small, and, even after the heating treatment, the cured product had excellent stress relaxation property.

In Comparative Example 8, the value of $(H_{B1}+H_{B2}+H_{B3})/(Vi_{A1}+Vi_{A2})$ was less than 0.6, and therefore curing at room temperature was slow.

In Comparative Example 9, the value of $(H_{B1}+H_{B2}+H_{B3})/(Vi_{A1}+Vi_{A2})$ was more than 2.2, and therefore air bubbles were confirmed in the cured product after the treatment under high-temperature and high-humidity conditions, and the occurrence of peeling and a crack in the resin was observed in all the test specimens after the cold heat cycle test, and thus the reliability under high-temperature and high-humidity conditions was poor.

In Comparative Example 10, both (A2) and (B3) were not contained, and therefore the stress relaxation property was poor, and further the occurrence of peeling and a crack in the resin was observed in all the test specimens after the cold heat cycle test, and thus the reliability under high-temperature and high-humidity conditions was poor.

In Comparative Example 11, instead of (B2), a linear polyorganohydrogensiloxane having a hydrogen atom bonded to the silicon atom in the intermediate unit was used, and therefore curing at room temperature was slow. In addition, in Comparative Example 11, the stress relaxation property was poor, and bubbles were confirmed in the cured product after the treatment under high-temperature and high-humidity conditions, and the occurrence of peeling and a crack in the resin was confirmed in the two test specimens after the cold heat cycle test, and thus the reliability under high-temperature and high-humidity conditions was poor.

A comparison was made between Example 17 and Example 3, and a comparison was made between Example 18 and Example 8. With respect to the cured products having almost the same weight of (A2), relative to 100 parts by weight of the total of (A1) and (A2), and having almost the same value of $(H_{B1}+H_{B2}+H_{B3})/(Vi_{A1}+Vi_{A2})$, the cured products in Examples 17 and 18, in which (B3) were contained, had a further reduced penetration change ratio and excellent stress relaxation property even after the heating treatment.

INDUSTRIAL APPLICABILITY

The curable polyorganosiloxane composition is useful in adhering a base portion having an image display part for an image display device such as a cathode ray tube, liquid crystal, plasma or organic EL image display device, to a light-transmitting protective portion.

The invention claimed is:
1. A curable polyorganosiloxane composition comprising:
    (A1) an alkenyl group-containing polyorganosiloxane represented by the following formula (I):

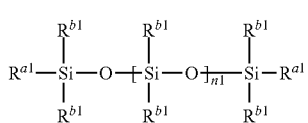

wherein:
each $R^{a1}$ is independently a $C_2$-$C_6$ alkenyl group,
each $R^{b1}$ is independently a $C_1$-$C_6$ alkyl group or a $C_6$-$C_{20}$ aryl group, and
n1 is a value such that the viscosity of the component (A1) at 23° C. is 10 to 1,000,000 m·Pas;
    (B1) a polyorganohydrogensiloxane represented by the following formula (II):

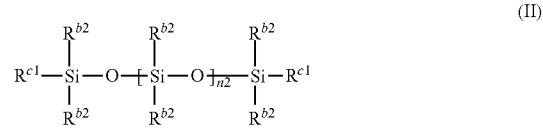

wherein:
each $R^{c1}$ is a hydrogen atom,
each $R^{b2}$ is independently a $C_1$-$C_6$ alkyl group or a $C_6$-$C_{20}$ aryl group, and
n2 is a value such that the viscosity of the component (B1) at 23° C. is 0.1 to 300 m·Pas;
    (B2) a polyorganohydrogensiloxane comprising a $R^{b3}_2R^{c2}SiO_{1/2}$ unit (wherein each $R^{b3}$ is independently a $C_1$-$C_6$ alkyl group or a $C_6$-$C_{20}$ aryl group, and $R^{c2}$ is a hydrogen atom) and a $SiO_{4/2}$ unit, and having three or more hydrogen atoms bonded to silicon atoms per molecule;
    at least one member selected from the group consisting of
    (A2) an alkenyl group-containing polyorganosiloxane represented by the following formula (III):

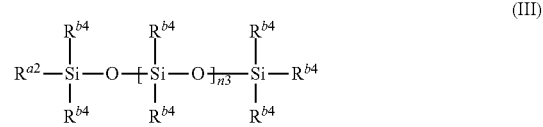

wherein:
each $R^{a2}$ is independently a $C_2$-$C_6$ alkenyl group,
each $R^{b4}$ is independently a $C_1$-$C_6$ alkyl group or a $C_6$-$C_{20}$ aryl group, and
n3 is a value such that the viscosity of the component (A2) at 23° C. is 10 to 1,000,000 mPa·s,
and
    (B3) a linear polyorganohydrogensiloxane represented by the following formula (IV):

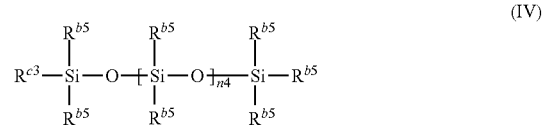

wherein:
$R^{c3}$ is a hydrogen atom,
each $R^{b5}$ is independently a $C_1$-$C_6$ alkyl group or a $C_6$-$C_{20}$ aryl group, and
n4 is a value such that the viscosity of the component (B3) at 23° C. is 0.1 to 300 mPa·s; and
    (C) a platinum-based catalyst,
        wherein the amount of the component (A2) is 0 to 60 parts by weight, relative to 100 parts by weight of the total of the components (A1) and (A2), and the value of $(H_{B1}+H_{B2}+H_{B3})/(Vi_{A1}+Vi_{A2})$ is 0.6 to 2.2, wherein $Vi_{A1}$ is the molar number of the alkenyl groups of the component (A1), $Vi_{A2}$ is the molar number of the alkenyl groups of the component (A2), $H_{B1}$ is the molar number of the hydrogen atoms bonded to the silicon atoms of the component (B1), $H_{B2}$ is the molar number of the hydrogen atoms bonded to the silicon atoms of the component (B2), and $H_{B3}$ is the molar number of the hydrogen atoms bonded to the silicon atoms of the component (B3), and wherein the component (B2) is a cyclic polyorganohydrogensiloxane having a cyclic siloxane skeleton formed from 3 to 5 $SiO_{4/2}$ units, in which two $R^{b3}{}_2R^{c2}SiO_{1/2}$ units are bonded to each $SiO_{4/2}$ unit.

2. The curable polyorganosiloxane composition according to claim 1, which contains the component (A2), wherein the value of $(H_{B1}+H_{B2})/(Vi_{A1}+Vi_{A2})$ is 0.6 to 2.2.

3. The curable polyorganosiloxane composition according to claim 2, wherein the amount of the component (A2) is 5 to 37 parts by weight, relative to 100 parts by weight of the total of the components (A1) and (A2), the value of $(H_{B1}+H_{B2})/(Vi_{A1}+Vi_{A2})$ is 0.6 to 0.99, and the value of $H_{B1}/(H_{B1}+H_{B2})$ is 0.3 to 0.8.

4. The curable polyorganosiloxane composition according to claim 2, which contains the component (B3), wherein the value of $(H_{B1}+H_{B2}+H_{B3})/Vi_{A1}$ is 0.6 to 2.5.

5. The curable polyorganosiloxane composition according to claim 4, wherein the value of $(H_{B1}+H_{B2}+H_{B3})/Vi_{A1}$ is 0.6 to 0.99.

6. The curable polyorganosiloxane composition according to claim 1, which contains the component (B3), wherein the value of $(H_{B1}+H_{B2}+H_{B3})/Vi_{A1}$ is 0.6 to 2.5.

7. The curable polyorganosiloxane composition according to claim 6, wherein the value of $(H_{B1}+H_{B2}+H_{B3})/Vi_{A1}$ is 0.6 to 0.99.

8. The curable polyorganosiloxane composition according to claim 1, which is for adhering a base portion having an image display part for an image display device to a light-transmitting protective portion.

9. An image display device which has a base portion having an image display part for the image display device and a light-transmitting protective portion, wherein the base portion is adhered to the protective portion using the curable polyorganosiloxane composition according to claim 1.

10. A curable polyorganosiloxane composition comprising:
(A1) an alkenyl group-containing polyorganosiloxane represented by the following formula (I):

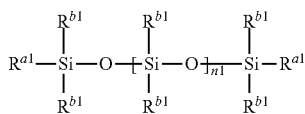

(I)

wherein:
each $R^{a1}$ is independently a $C_2$-$C_6$ alkenyl group,
each $R^{b1}$ is independently a $C_1$-$C_6$ alkyl group or a $C_6$-$C_{20}$ aryl group, and
n1 is a value such that the viscosity of the component (A1) at 23° C. is 10 to 1,000,000 mPa·s;

(B1) a polyorganohydrogensiloxane represented by the following formula (II):

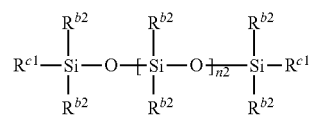

(II)

wherein:
each $R^{c1}$ is a hydrogen atom,
each $R^{b2}$ is independently a $C_1$-$C_6$ alkyl group or a $C_6$-$C_{20}$ aryl group, and
n2 is a value such that the viscosity of the component (B1) at 23° C. is 0.1 to 300 mPa·s;

(B2) a polyorganohydrogensiloxane comprising a $R^{b3}{}_2R^{c2}SiO_{1/2}$ unit (wherein each $R^{b3}$ is independently a $C_1$-$C_6$ alkyl group or a $C_6$-$C_{20}$ aryl group, and $R^{c2}$ is a hydrogen atom) and a $SiO_{4/2}$ unit, and having three or more hydrogen atoms bonded to silicon atoms per molecule;

at least one member selected from the group consisting of
(A2) an alkenyl group-containing polyorganosiloxane represented by the following formula (III):

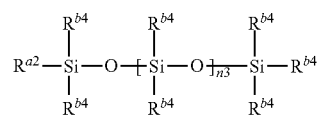

(III)

wherein:
each $R^{a2}$ is independently a $C_2$-$C_6$ alkenyl group,
each $R^{b4}$ is independently a $C_1$-$C_6$ alkyl group or a $C_6$-$C_{20}$ aryl group, and
n3 is a value such that the viscosity of the component (A2) at 23° C. is 10 to 1,000,000 mPa·s, and (B3) a linear polyorganohydrogensiloxane represented by the following formula (IV):

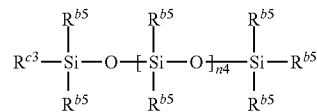

(IV)

wherein:
$R^{b3}$ is a hydrogen atom,
each $R^{b5}$ is independently a $C_1$-$C_6$ alkyl group or a $C_6$-$C_{20}$ aryl group, and n4 is a value such that the viscosity of the component (B3) at 23° C. is 0.1 to 300 mPa·s;
and (C) a platinum-based catalyst,
wherein the amount of the component (A2) is 0 to 60 parts by weight, relative to 100 parts by weight of the total of the components (A1) and (A2), and the value of $(H_{B1}+H_{B2}+H_{B3})/(Vi_{A1}+Vi_{A2})$ is 0.6 to 2.2, wherein $Vi_{A1}$ is the molar number of the alkenyl groups of the component (A1), $Vi_{A2}$ is the molar number of the alkenyl groups of the component (A2), $H_{B1}$ is the molar number of the hydrogen atoms bonded to the silicon atoms of the component (B1), $H_{B2}$ is the molar number of the hydrogen atoms bonded to the silicon atoms of the component (B2), and $H_{B3}$ is the molar number of the hydrogen atoms bonded to the silicon atoms of the component (B3), wherein the curable polyorganosiloxane composition contains the component (A2), wherein the value of $(H_{B1}+H_{B2})/(Vi_{A1}+Vi_{A2})$ is 0.6 to 2.2, and wherein the amount of the component (A2) is 5 to 37 parts by weight, relative to 100 parts by weight of the total of the components (A1) and (A2), the value of $(H_{B1}+H_{B2})/(Vi_{A1}+Vi_{A2})$ is 0.6 to 0.99, and the value of $H_{B1}/(H_{B1}+H_{B2})$ is 0.3 to 0.8.

11. The curable polyorganosiloxane composition according to claim 10, which is for adhering a base portion having an image display part for an image display device to a light-transmitting protective portion.

12. An image display device which has a base portion having an image display part for the image display device and a light-transmitting protective portion, wherein the base portion is adhered to the protective portion using the curable polyorganosiloxane composition according to claim 10.

13. The curable polyorganosiloxane composition according to claim 10, which contains the component (B3), wherein the value of $(H_{B1}+H_{B2}+H_{B3})/Vi_{A1}$ is 0.6 to 2.5.

14. The curable polyorganosiloxane composition according to claim 13, wherein the value of $(H_{B1}+H_{B2}+H_{B3})/Vi_{A1}$ is 0.6 to 0.99.

15. A curable polyorganosiloxane composition comprising:

(A1) an alkenyl group-containing polyorganosiloxane represented by the following formula (I):

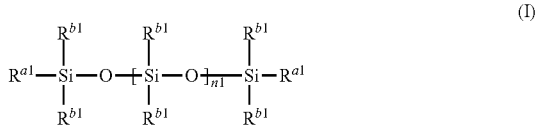

wherein:
each $R^{a1}$ is independently a $C_2$-$C_6$ alkenyl group,
each $R^{b1}$ is independently a $C_1$-$C_6$ alkyl group or a $C_6$-$C_{20}$ aryl group, and n1 is a value such that the viscosity of the component (A1) at 23° C. is 10 to 1,000,000 mPa·s;

(B1) a polyorganohydrogensiloxane represented by the following formula (II):

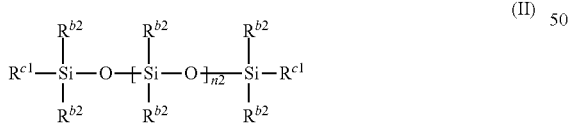

wherein:
each $R^{c1}$ is a hydrogen atom,
each $R^{b2}$ is independently a $C_1$-$C_6$ alkyl group or a $C_6$-$C_{20}$ aryl group, and
n2 is a value such that the viscosity of the component (B1) at 23° C. is 0.1 to 300 mPa·s;

(B2) a polyorganohydrogensiloxane comprising a $R^{b3}_2R^{c2}SiO_{1/2}$ unit (wherein each $R^{b3}$ is independently a $C_1$-$C_6$ alkyl group or a $C_6$-$C_{20}$ aryl group, and $R^{c2}$ is a hydrogen atom) and a $SiO_{4/2}$ unit, and having three or more hydrogen atoms bonded to silicon atoms per molecule;

at least one member selected from the group consisting of (A2) an alkenyl group-containing polyorganosiloxane represented by the following formula (III):

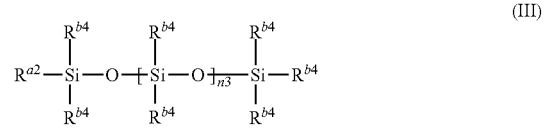

wherein:
each $R^{a2}$ is independently a $C_2$-$C_6$ alkenyl group,
each $R^{b4}$ is independently a $C_1$-$C_6$ alkyl group or a $C_6$-$C_{20}$ aryl group, and
n3 is a value such that the viscosity of the component (A2) at 23° C. is 10 to 1,000,000 mPa·s,
and (B3) a linear polyorganohydrogensiloxane represented by the following formula (IV):

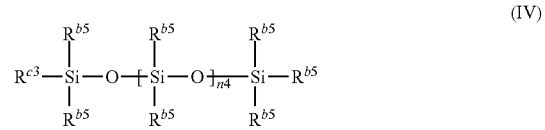

wherein:
$R^{b3}$ is a hydrogen atom,
each $R^{b5}$ is independently a $C_1$-$C_6$ alkyl group or a $C_6$-$C_{20}$ aryl group, and
n4 is a value such that the viscosity of the component (B3) at 23° C. is 0.1 to 300 mPa·s; and (C) a platinum-based catalyst,
wherein the amount of the component (A2) is 0 to 60 parts by weight, relative to 100 parts by weight of the total of the components (A1) and (A2), and the value of $(H_{B1}+H_{B2}+H_{B3})/(Vi_{A1}+Vi_{A2})$ is 0.6 to 2.2, wherein Vim is the molar number of the alkenyl groups of the component (A1), $Vi_{A2}$ is the molar number of the alkenyl groups of the component (A2), $H_{B1}$ is the molar number of the hydrogen atoms bonded to the silicon atoms of the component (B1), $H_{B2}$ is the molar number of the hydrogen atoms bonded to the silicon atoms of the component (B2), and $H_{B3}$ is the molar number of the hydrogen atoms bonded to the silicon atoms of the component (B3), and
wherein the curable polyorganosiloxane composition contains the component (B3), wherein the value of $(H_{B1}+H_{B2}+H_{B3})/Vi_{A1}$ is 0.6 to 2.5.

16. The curable polyorganosiloxane composition according to claim 5, which contains the component (A2), wherein the value of $(H_{B1}+H_{B2})/(Vi_{A1}+Vi_{A2})$ is 0.6 to 2.2.

17. The curable polyorganosiloxane composition according to claim 15, wherein the value of $(H_{B1}+H_{B2}+H_{B3})/Vim$ is 0.6 to 0.99.

18. The curable polyorganosiloxane composition according to claim 15, which is for adhering a base portion having an image display part for an image display device to a light-transmitting protective portion.

19. An image display device which has a base portion having an image display part for the image display device and a light-transmitting protective portion, wherein the base portion is adhered to the protective portion using the curable polyorganosiloxane composition according to claim 15.

* * * * *